United States Patent [19]

Huffman et al.

[11] 4,434,485
[45] Feb. 28, 1984

[54] DROP AND INSERT CHANNEL BANK WITH REDUCED CHANNEL UNITS

[75] Inventors: Charles E. Huffman; Stephen R. Southerland, both of Plano, Tex.

[73] Assignee: Rockwell International Corporation, El Segundo, Calif.

[21] Appl. No.: 206,497

[22] Filed: Nov. 13, 1980

[51] Int. Cl.³ .............................................. H04Q 11/04
[52] U.S. Cl. ........................................ 370/55; 370/58
[58] Field of Search ............................ 370/55, 58, 112

[56] References Cited

U.S. PATENT DOCUMENTS

| | | | |
|---|---|---|---|
| 2,740,838 | 4/1956 | Pierce | 370/55 |
| 4,046,964 | 9/1977 | Daugherty et al. | 370/55 |
| 4,105,869 | 8/1978 | Aveneau et al. | 370/55 |
| 4,271,508 | 6/1981 | Schenk | 370/112 |

OTHER PUBLICATIONS

"A PCM Drop-Insert Switching System and its Channel Rearrangements" by Akiyama et al., Electronics and Communications in Japan, vol. 52-A, No. 11, 1969, pp. 42-50.
"Single Channel Drop and Insert", by Marconi Co., Telecommunications Applications, Sep. 1973, pp. 41-44.

Primary Examiner—Douglas W. Olms
Attorney, Agent, or Firm—Michael E. Taken; V. Lawrence Sewell; Howard R. Greenberg

[57] ABSTRACT

A drop and insert channel bank is provided for receiving data from and inserting data onto a multichannel digital transmission line, such as a microwave radio link, between end terminals. The channel bank has a plurality of single channel units which share common equipment, including a receiver and a transmitter from and to the transmission line and a switching unit therebetween. The switching unit includes user controlled selection circuitry enabling any channel on the line to be dropped to any of the channel units, and enabling any channel to be inserted on the line from any of the channel units. Through-traffic passes through the receiver, switching unit and transmitter of the channel bank in digital form without conversion to and from analog form. Unidirectional and bidirectional modes are disclosed, including various forms of each.

16 Claims, 20 Drawing Figures

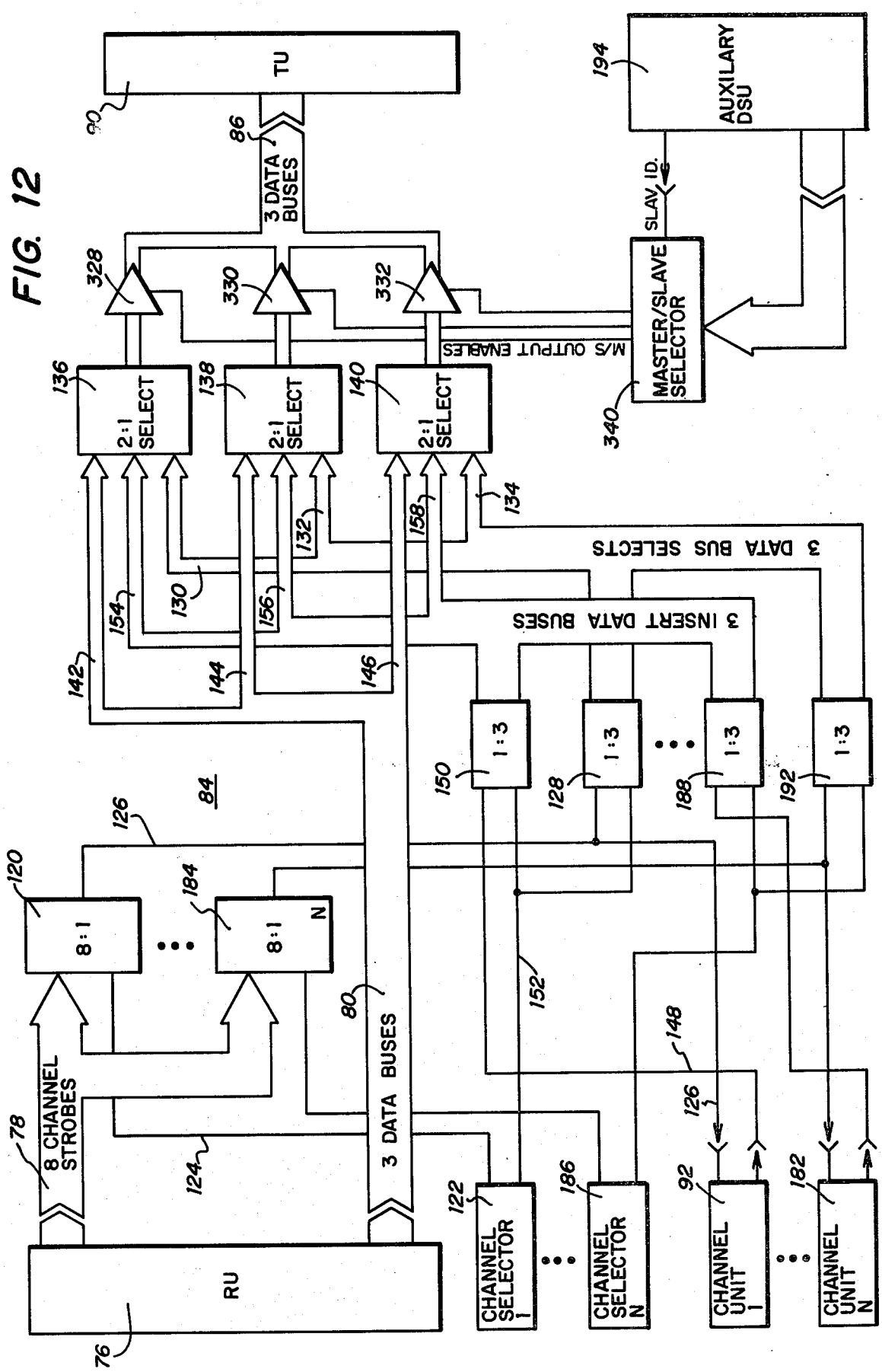

DROP AND INSERT CHANNEL BANK WITH REDUCED CHANNEL UNITS

TECHNICAL FIELD

The invention relates to means for receiving data from and/or inserting data onto a transmission medium between end terminals.

BACKGROUND

In a data transmission system, signals are carried between end terminals over some medium, such as a hard wire line, fiber optic link, radiated electromagnetic wave, etc. For high density usage, the transmission medium carries a plurality of multiplexed data channels. This is particularly common in telecommunication systems, FIG. 1, where the end terminals include multiplexing and demultiplexing equipment and each path therebetween carries a plurality of time division multiplexed digital channels, typically twenty-four in North America and thirty in Europe.

It may be desirable to listen to and/or substitute channels on the transmission line between the end terminals. This would enable an operator at an intermediate location to listen and/or talk to the ends. Equipment providing this capability is known, and referred to as channel banks in a drop and insert configuration, FIG. 2. These banks enable a channel to be dropped from the line, i.e. listened to. The banks also enable a channel to be inserted on the line to substitute for an existing data channel in that time slot.

The standard approach for dropping and inserting channels between end terminals is to use two completely equipped channel banks cross-connected at the voice frequency (VF) interface. In FIG. 2, each of the end terminals is a channel bank having a VF interface to the various telephone subscribers. Drop and insert operation is performed by an additional pair of channel banks in the middle, which are equipped for each channel and convert the digital transmission data on the line to VF analog signals for each channel. There are thus twenty-four VF analog signals passing between the central pair of channel banks, any of which signals may be dropped or inserted.

A drawback of the above approach is the high cost of two completely equipped channel banks, and the wasteful inefficiency thereof when only a small number of channels are dropped and inserted. For example, to drop and insert only one channel would require that all channels be equipped.

Another drawback of the above approach is the degradation of the signal caused by the digital to analog to digital conversion performed by the channel bank pair. This is particularly objectionable when it is desired to use a number of such pairs between the end terminals. Signal degradation limits the number of such pairs and hence the total number of locations for dropping and inserting channels.

SUMMARY OF THE INVENTION

The present invention provides a drop and insert channel bank affording both significant cost saving and improved performance. The invention particularly overcomes the aforenoted and other drawbacks of prior approaches in providing a channel bank which enables any channel to be dropped and/or inserted without using fully equipped conventional channel banks. The invention further provides a channel bank which enables channel passage therethrough solely in digital form without conversion to and from analog form.

The invention is particularly flexible in application. The channel bank has a plurality of single channel units which share common equipment, including a receiver and a transmitter from and to the transmission line and a switching unit therebetween. The switching unit includes user controlled selection circuitry enabling any channel on the line to be dropped to any of the channel units, and enabling any channel to be inserted on the line from any of the channel units. This flexible selectivity enables the number of channel units to be reduced because in actual practice the need does not arise to drop and/or insert all channels at the same time. For example, four to eight channel units for a twenty-four channel transmission line usually afford adequate capacity. The system easily accommodates extra channel units for additional capacity. The commonly shared equipment and the reduced number of channel units is cost effective in its efficient use of equipment.

The invention is further particularly versatile in application. This versatility affords unidirectional and bidirectional modes, each having various formed, and also affords a wide choice of listening (dropping) and talking (inserting) options relative to the end terminals. In a unidirectional mode, the channel bank user can listen and talk to the same end terminal, or he can listen to one terminal and talk to the opposite terminal. In a bidirectional mode, the channel bank user can listen and talk to any combination of terminals and their channels. For example, a bidirectional drop and insert channel bank placed between east and west terminals enables the user to listen to either or both terminals on any channel or channels and to talk to either or both terminals on any channel or channels. The invention thus has broad application to general signal reception from either or both of a pair of end terminals by dropping one or more channels from a transmission medium therebetween, and to general signal transmission to either or both of the end terminals by inserting one or more channels on the transmission medium.

The bidirectional channel bank has a pair of receivers, one for eastbound traffic and the other for westbound traffic, a pair of transmitters, one for eastbound traffic and the other for westbound traffic, and a pair of switching units each having a set of channel units. In preferred form, one switching unit is connected between the eastbound receiver and the westbound transmitter for listening and talking to the west terminal, and the other switching unit is connected between the westbound receiver and the eastbound transmitter for listening and talking to the east terminal. In another form, one switching unit is connected between the eastbound receiver and eastbound transmitter for listening to the west terminal and talking to the east terminal, and the other switching unit is connected between the westbound receiver and the westbound transmitter for listening to the east terminal and talking to the west terminal. In both forms, eastbound and westbound through-traffic pass through the receivers, switching units and transmitters of the channel bank in digital form without conversion to and from analog form.

BRIEF DESCRIPTION OF THE DRAWINGS

FIG. 12 schematically shows the insert circuitry of FIG. 10.

DETAILED DESCRIPTION

Figure 1:
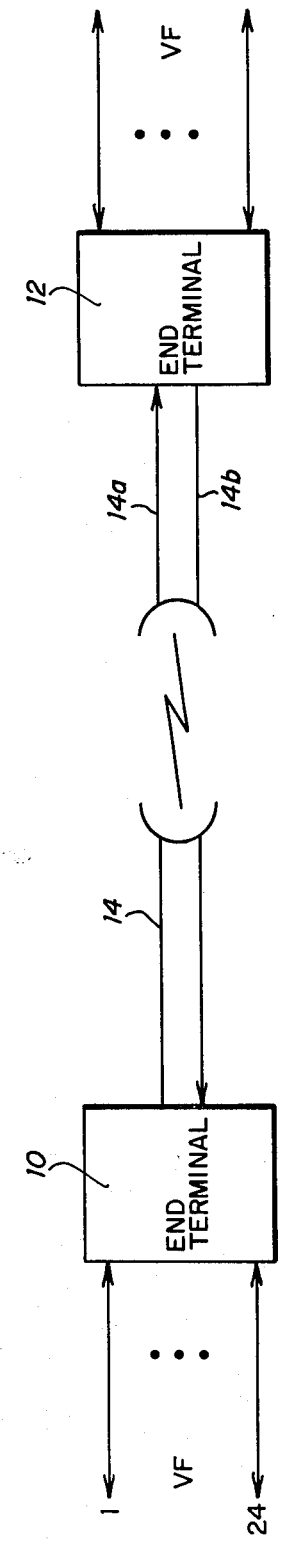
FIG. 1 is an illustration of a transmission system having end terminals with a transmission medium therebetween.

FIG. 1 shows a digital transmission system having end terminals 10 and 12 and a transmission medium 14 therebetween. This transmission medium may, for example, take the form of span line or microwave radio paths. In a telecommunications system, it is common to provide high density usage by transmitting data in time division multiplexed form on transmission medium 14. The end terminals include multiplexing and demultiplexing circuitry and a voice frequency (VF) interface for receiving and transmitting a plurality of channels. For example, in North America, twenty-four channels are typically multiplexed for serial transmission over each transmission path 14a and 14b. Thirty channel transmission is standard in Europe. Each end terminal is typically formed by a channel bank having the desired number of channels and the appropriate conversion circuitry.

Figure 2:
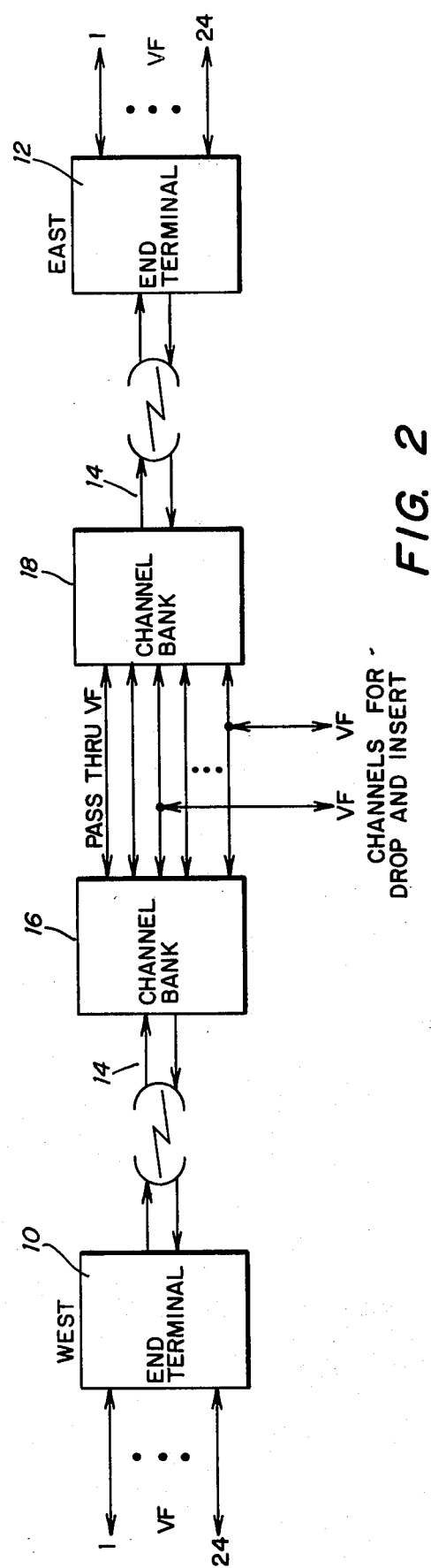
FIG. 2 illustrates the standard drop and insert approach using a pair of fully equipped channel banks cross-connected at the voice frequency interface.

Somewhere along transmission medium 14 it may be desirable to receive or listen to the data being transmitted, and to insert data onto the transmission medium 14. FIG. 2 shows the standard drop and insert approach wherein a pair of channel banks 16 and 18 are placed in the transmission medium 14 and cross-connected at the voice frequency interface. In order to enable any channel to be dropped and inserted, each channel bank 16 and 18 must be completely equipped, i.e. have dedicated conversion circuitry for each channel. Additionally, eastbound through-traffic is converted by channel bank 16 to analog form and reconverted to digital form by channel bank 18, and vice versa for westbound through-traffic. These conversions degrade the signal. This signal degradation becomes objectional when compounded by additional drop and insert locations further degrading the signal. The conversions thus limit the total number of drop and insert locations between end terminals.

Figure 3:
FIGS. 3–5 illustrate the standard North American framing format for telecommunication.
Figure 4:
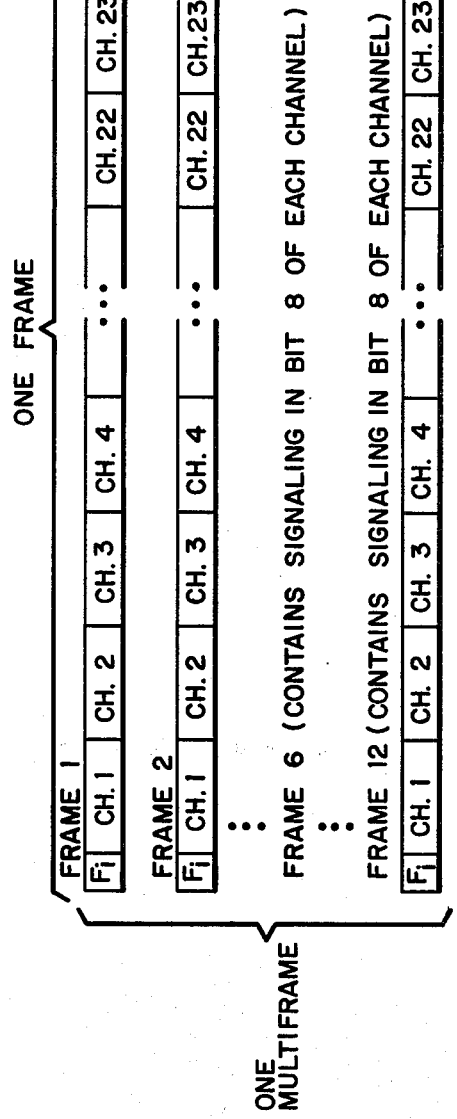
Figure 5:
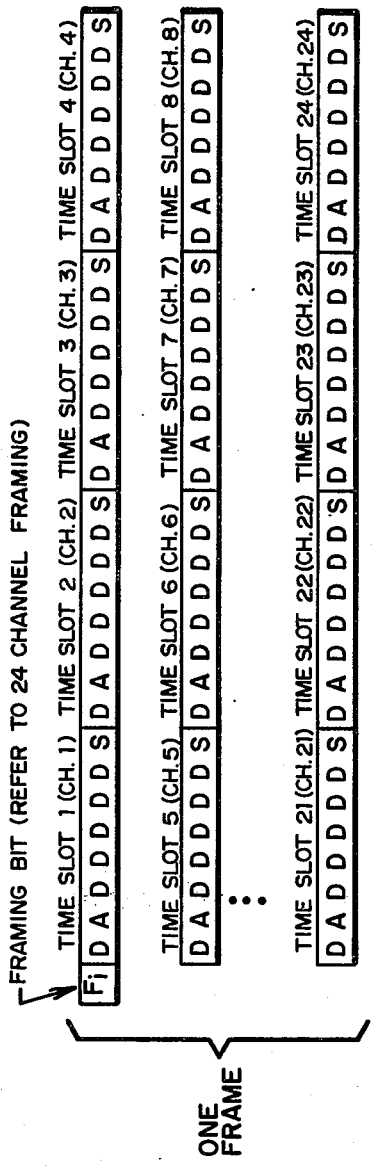

The preferred embodiment of the present invention is disclosed in a telecommunication system employing the standard North American framing format. In this format, FIG. 3, a line carries serial multiplexed data at a 1.544 megabit per second rate, with twenty-four channels to a frame and twelve frames to a multiframe. Each multiframe contains 2316 bits at the 1.544 megabit per second rate. Referring to FIG. 4, each frame contains 193 bits at the 1.544 megabit per second rate. Each frame includes an initial framing bit $F_i$ plus twenty-four channel time slots. The framing bit code is 100011011100 for frames 1 through 12, respectively. Odd numbered frames are used for frame alignment, and even numbered frames are used for multiframe alignment. Referring to FIG. 5, each time slot is eight bits wide.

Figure 6:
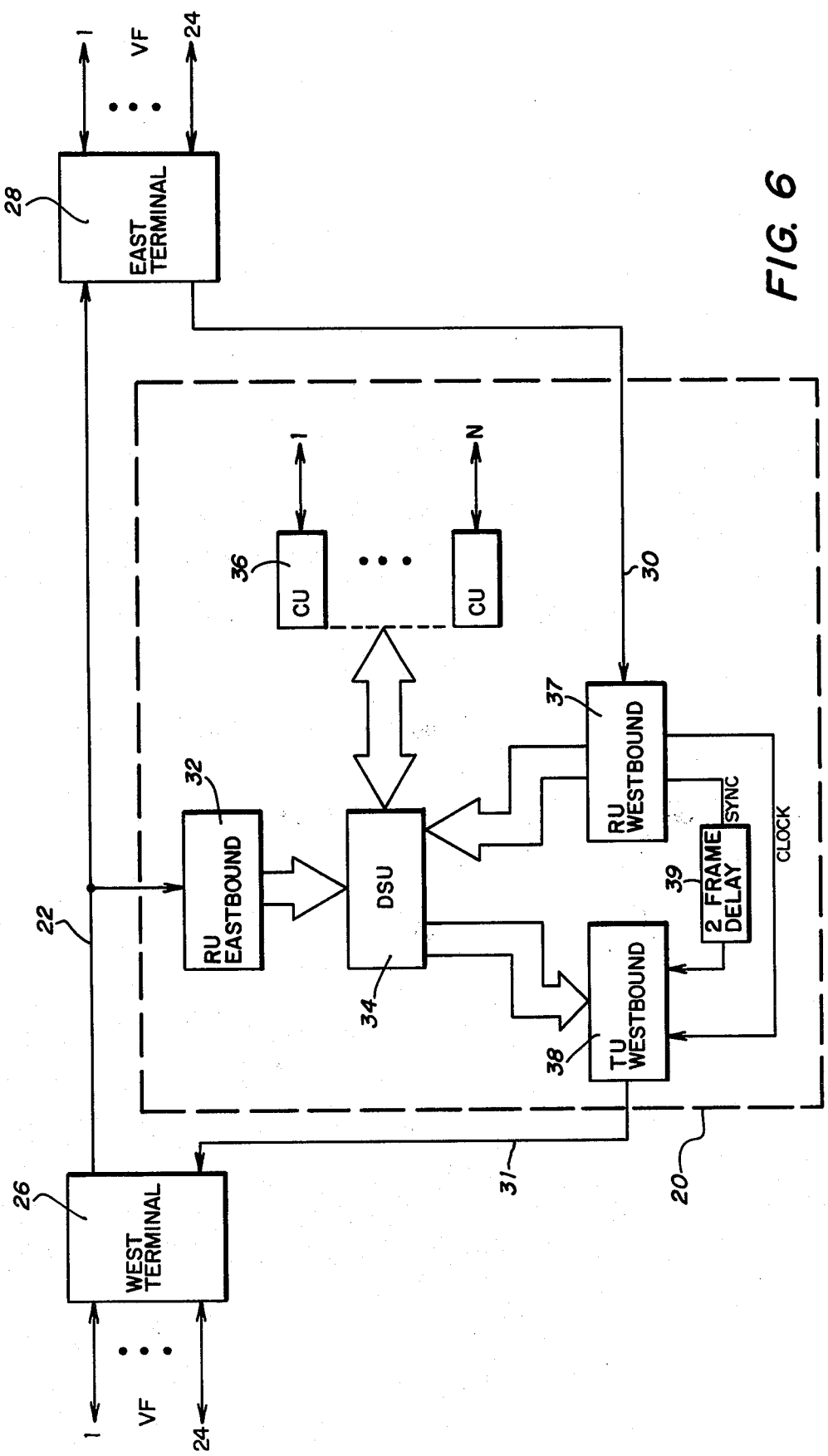
FIG. 6 illustrates a unidirectional drop and insert channel bank constructed in accordance with the invention.

FIG. 6 shows a unidirectional drop and insert channel bank 20, within the dashed line, constructed in accordance with the invention. This channel bank drops channels from the eastbound traffic on line 22 between west terminal 26 and east terminal 28, and inserts data in the westbound traffic between lines 30 and 31. Each of these lines carries data at the 1.544 megabit per second rate in accordance with the above described format.

Eastbound traffic on line 22 is delivered in parallel to the east terminal 28 and to a receive unit (RU) 32 in channel bank 20. Receive unit 32 demultiplexes the data to Y buses of X channels each, for example three buses each having eight channels. In a European system, the preferred matrix is four buses of eight channels each. The bus structure is of course not a constraint of the invention, nor is demultiplexing of the data (e.g. Y=1, X=24).

Figure 7:
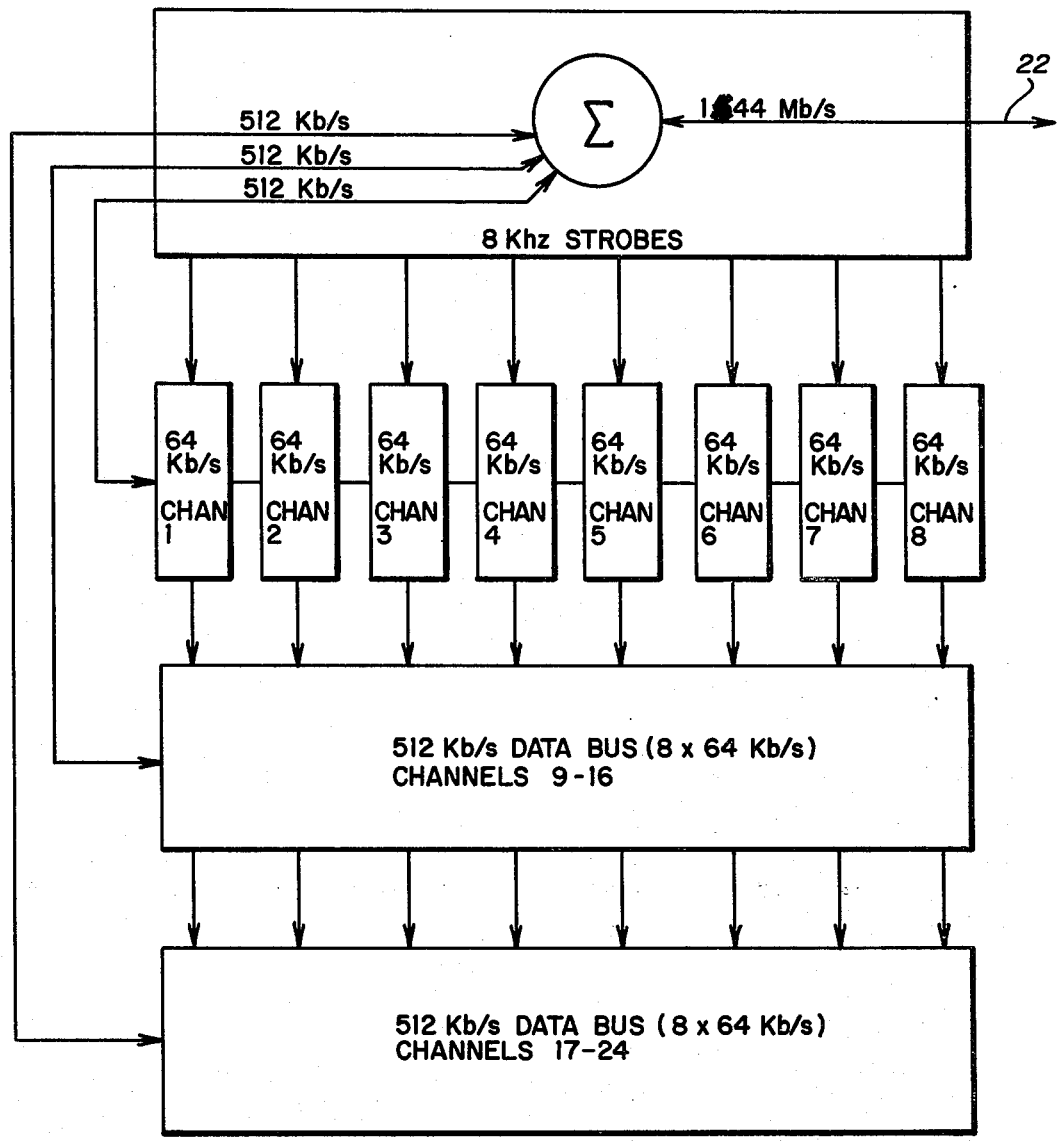
FIG. 7 illustrates the channel strobe and data bus matrix used in FIG. 6.

FIG. 7 shows a three bus by eight channel strobe matrix. Each of the three buses carries data at a 512 kilobit per second rate, which is approximately one-third of the 1.544 megabit per second rate on line 22. Three buses in conjunction with eight channel strobes at an 8 KHz rate provide channel selection. This 3×8 matrix thus defines the twenty-four channels on line 22.

The three data buses and the eight channel strobes are output from receive unit 32 to data switching unit (DSU) 34, FIG. 6. Data switching unit 34 extracts the specified data bus and channel strobe as chosen by the user and delivers channel data to N channel units (CU) 36. In one form, four channel units are provided. These channel units may be modules with standard voice interfaces or standard data interfaces (for example, to a computer link, etc.).

Data is inserted from channel units 36 to data switching unit 34 which substitutes the channel data in the appropriate time slot in the westbound traffic between lines 30 and 31. A westbound receive unit (RU) 37 sends three data buses and eight channel strobes to the data switching unit 34 which then either passes each channel unaltered or inserts data. Both the unaltered and inserted data are then sent to a westbound transmit unit (TU) 38 which multiplexes the data to serial form at the 1.544 megabit per second rate for transmission to the west terminal 26.

Transmit unit 38 is synchronized to receive unit 37 and uses the same clocking. The clocking for receive units 37 and 32 is provided by any of the well-known techniques of clock extraction from a data stream, such as by a phase locked loop. Synchronization is provided by delaying the sync signal by an integral channel time slot repetition period, for example a two frame delay provided by a counter register 39. When receive unit 37 is receiving frame 5, channel 1 from line 30, for example, data switching unit 34 is receiving frame 4, channel 1 from receive unit 37. At the same time, data switching unit 34 is sending frame 4, channel 1 to transmit unit 38, and transmit unit 38 is sending frame 3, channel 1 to west terminal 26. Transmit unit 38 is thus two frames behind receive unit 37 due to the demultiplexing and then multiplexing operations performed. The sync signal is delayed by two frames such that the initial framing bit ($F_i$ in FIGS. 4 and 5) of frame 5 on line 30 also occurs at the beginning of frame 5 on line 31, not at the beginning of frame 3. The initial framing bit $F_i$ thus waits for its respective frame to catch up and then tells transmit unit 38 which frame it is outputting. Synchronization is described in greater detail hereinafter in conjunction with FIGS. 16–18.

Figure 8:
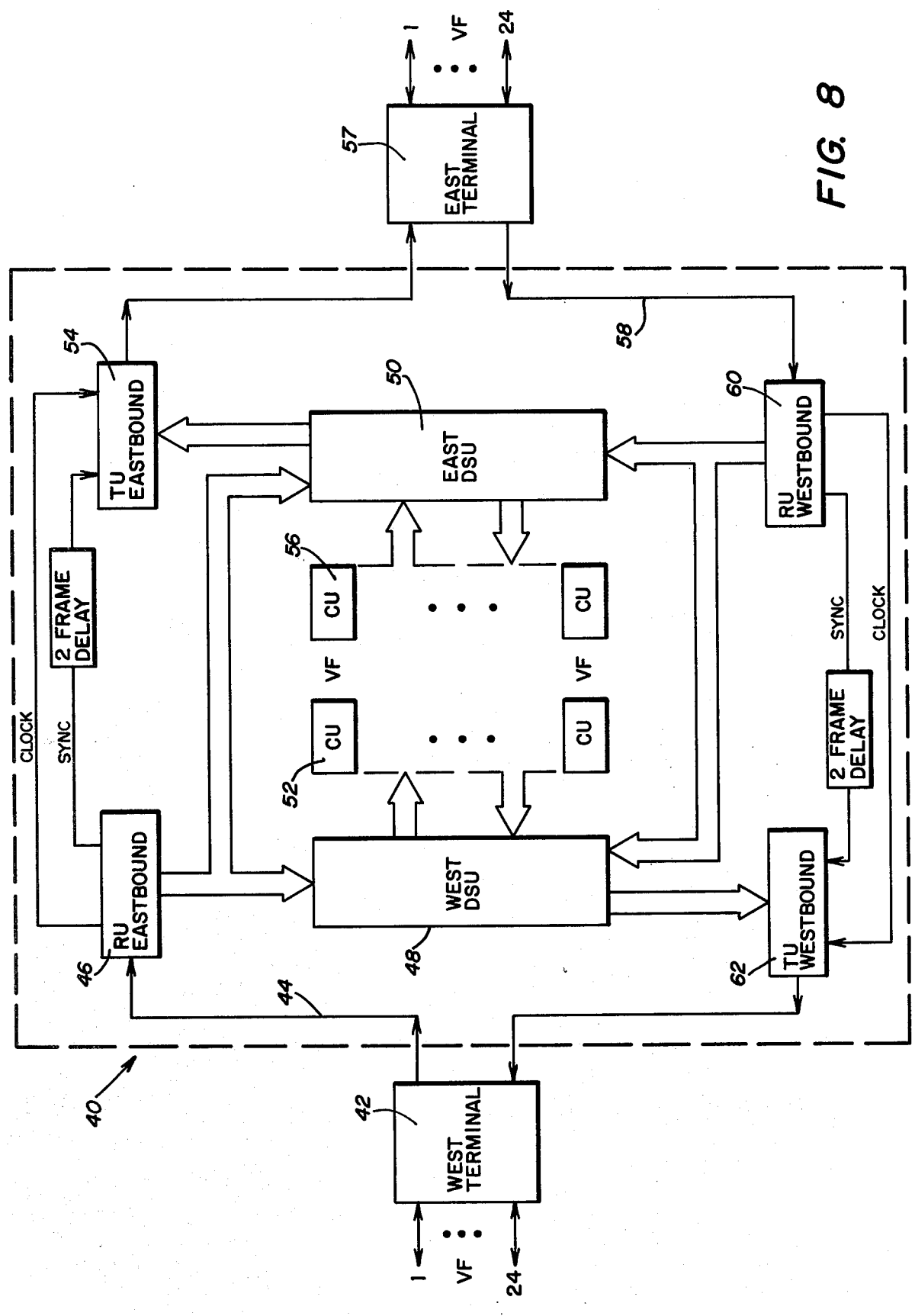
FIG. 8 illustrates a bidirectional drop and insert channel bank constructed in accordance with the invention.

FIG. 8 shows a bidirectional drop and insert channel bank 40 constructed in accordance with the invention. Data from west terminal 42 travels eastbound on line 44 to eastbound receive unit (RU) 46. The data is then delivered to a west data switching unit (DSU) 48 and to an east data switching unit (DSU) 50. West switching unit 48 drops the channels to west channel units (CU) 52. East switching unit 50 passes the data from eastbound receive unit 46 unaltered to eastbound transmit unit (TU) 54 or inserts channel data from each channel units (CU) 56 and then passes the data to eastbound transmit unit 54. The output of eastbound transmit unit 54 is delivered to east terminal 57.

Data from east terminal 57 travels westbound on line 58 to westbound receive unit (RU) 60 which delivers the data to east switching unit 50 and to west switching unit 48. The east switching unit 50 can drop westbound channel data to each channel units 56. The west switching unit 48 can insert data from west channel units 52 into the westbound traffic. West switching unit 48 passes the westbound traffic from receive unit 60 either unaltered or with the substituted channels from units 52 to westbound transmit unit (TU) 62 which delivers the data to west terminal 42. The eastbound receive and transmit units and the westbound receive and transmit units are synced and clocked as above.

In the embodiment of FIG. 8, an operator at west channel units 52 can listen to and talk to the west terminal on any channel. An operator at east channel units 56 can listen to and talk to the east terminal on any channel. In this particular embodiment, there are eight channel units 52 and eight channel units 56.

Figure 9:
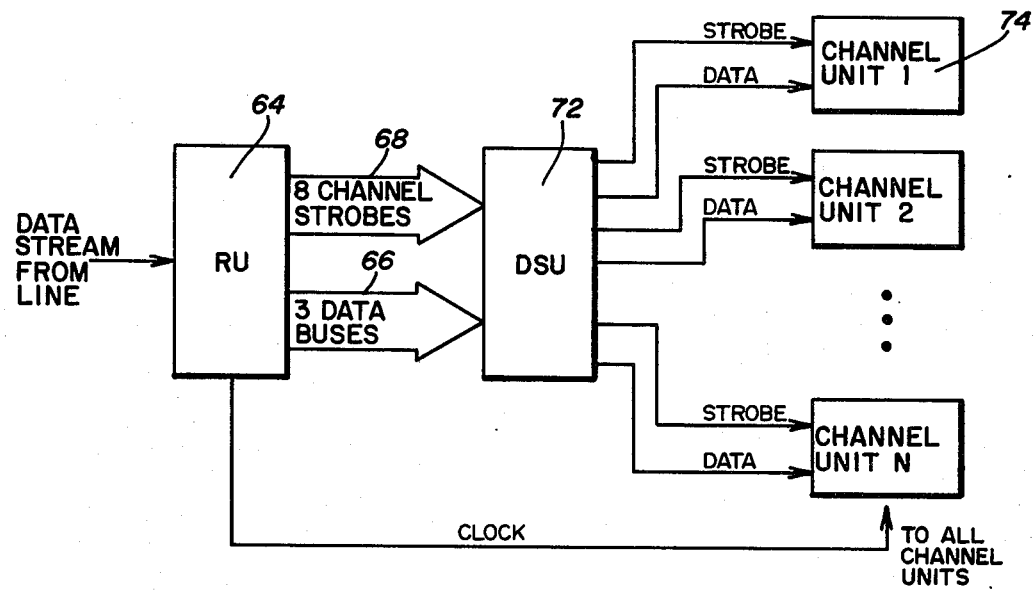
FIG. 9 illustrates the drop operation of FIGS. 6 and 8.

FIG. 9 shows the drop operation of FIGS. 6 and 8. A receive unit 64 demultiplexes the 1.544 megabit per second 24 channel serial data stream into three buses of 512 kilobit per second streams 66 and eight channel strobes 68. Data switching unit 72 routes selected channel strobes and data buses buses to respectively chosen channel units 74. For example the first channel unit receives one of the eight channel strobes and one of the three data buses which uniquely determines one of the 24 channels from the line. The channel units are clocked by the receive unit.

Figure 10:
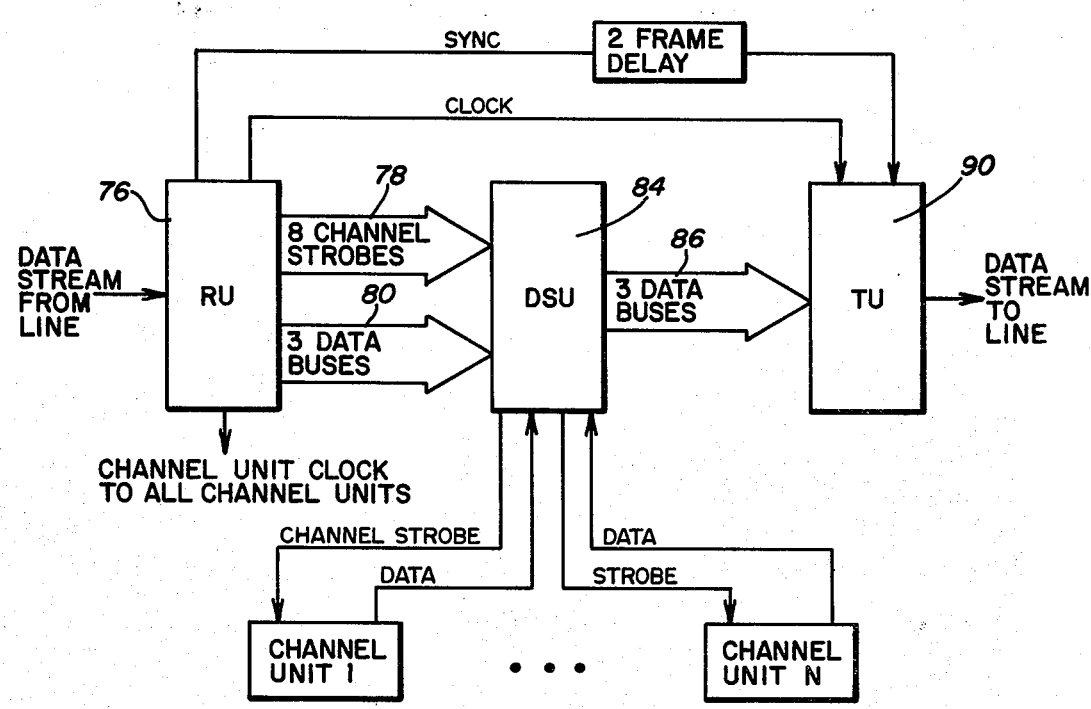
FIG. 10 illustrates the insert operation of FIGS. 6 and 8.

FIG. 10 illustrates the insert operation of FIGS. 6 and 8. A receive unit 76 demultiplexes the 1.544 megabit per second 24 channel serial data stream into eight channel strobes 78 and three buses of 512 kilobit per second data streams 80. Data switching unit 84 normally passes the data streams on output bus 86 unaltered to transmit unit 90 which is synced and clocked by receive unit 76. Data switching unit 84 sends the channel strobes to the channel units for strobing data from the channel units into the data switching unit as respectively chosen by the user. For example, the data switching unit 84 enables one of the eight channel strobes to gate data from the selected channel unit into one of the three data buses 86. Receive unit 76 clocks the channel units.

Figure 11:
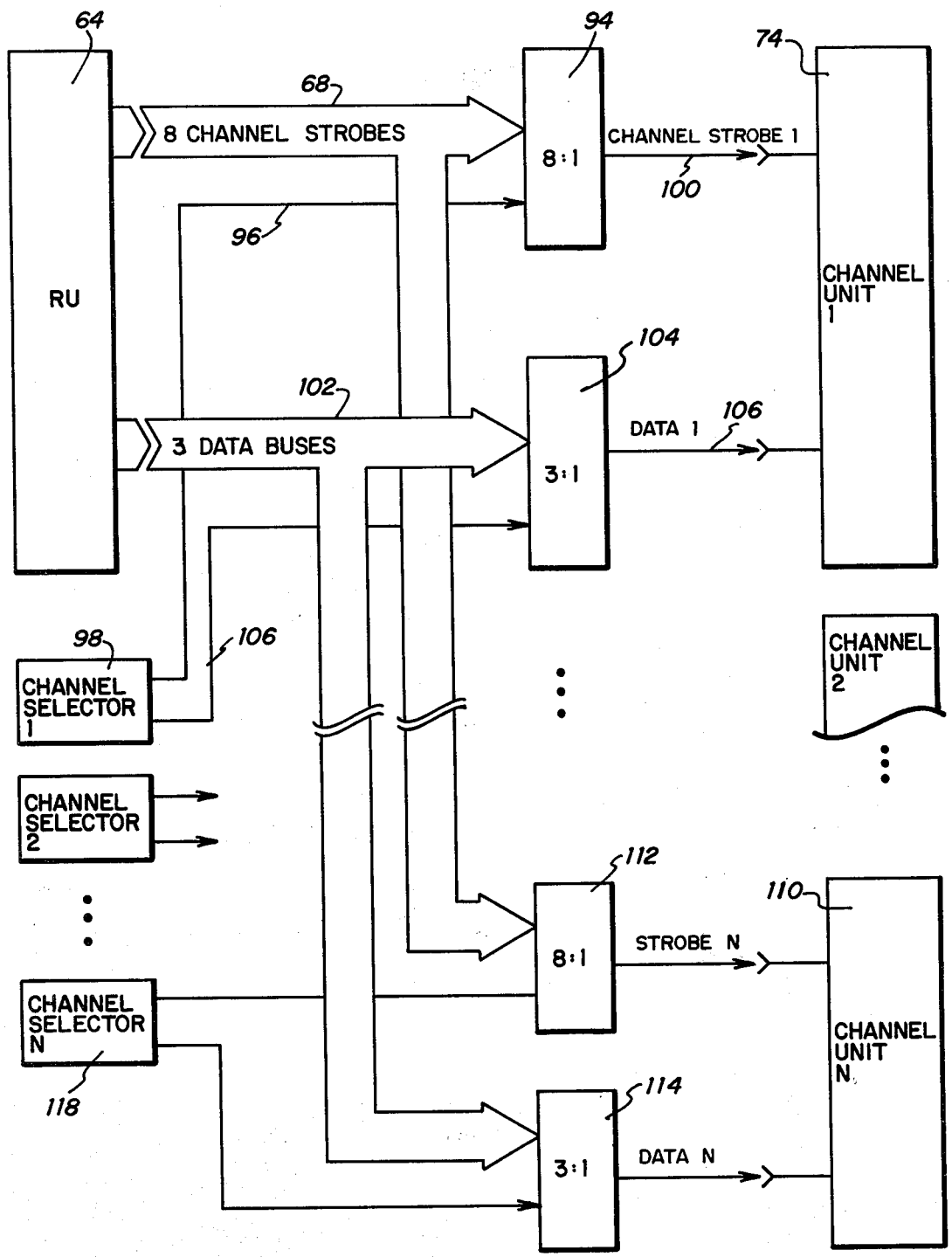
FIG. 11 schematically shows the drop circuitry of FIG. 9.

FIG. 11 schematically shows the drop circuitry of FIG. 9. Receive unit 64 sends the eight channel strobes 68 to an 8 to 1 selector/multiplexer 94 for the first channel unit 74. Selector 94 chooses one of the eight channel strobes in accordance with a three bit control code on line 96 from a channel selector 98 for the first channel unit. The chosen channel strobe is output on line 100 to the first channel unit 74. Receive unit 64 sends the three data streams 102 to a 3 to 1 selector 104 which chooses one of the three buses in accordance with a two bit control code on line 106 from channel selector 98. The chosen bus is output on line 106 to the first channel unit 74.

As seen in FIG. 11, each channel unit has its own set of selectors. In one form, four channel units are provided and the fourth channel unit 110 is provided with a one of eight strobe selector 112, a one of three data bus selector 114, and a user controlled channel selector 118 for making the one of eight and one of three selections.

FIG. 12 schematically shows the insert circuitry of FIG. 10. Receive unit 76 sends the eight channel strobes 78 to an 8:1 selector 120 for the first channel unit 92. A user controlled channel selector 122 for the first channel unit sends a three bit control on line 124 to selector 120 for making the selection. The selected channel strobe is output on line 126 and sent to the first channel unit 92 and to a 1:3 distributor/demultiplexer or decoder 128. Distributor 128 has three output buses 130, 132 and 134 connected respectively to the selection inputs of three selectors 136, 138 and 140. Selector 136 chooses one of its two inputs in accordance with the control code on bus 130. Selectors 138 and 140 are comparable 2:1 selectors.

Receive unit 76 sends three data buses 142, 144 and 146 (collectively 80 in FIG. 10) to selectors 136, 138 and 140, respectively. The data streams on buses 142, 144 and 146 are normally chosen by selectors 136, 138 and 140 in the absence of a data insert signal on buses 130, 132 and 134. The digital data streams on buses 142, 144 and 146 pass through selectors 136, 138 and 140 unaltered and are output on bus 86 to transmit unit 90.

The remaining one of the two inputs to selectors 136, 138 and 140 are data from the channel units to be inserted in the output data streams when enabled by the select control code on buses 130, 132 and 134. The first channel unit 92 is strobed by the selected channel strobe on 126 and sends data on line 148 to a 1:3 distributor 150 comparable to distributor 128. User controlled channel selector 122 for the first channel unit sends a two bit control code on line 152 to distributors 150 and 128 for determining which of the three output buses from each is enabled. Distributor 128 sends the channel strobe from line 126 over one of its output buses 130, 132 and 134. Distributor 150 sends the channel unit insert data from line 148 over one of three output buses 154, 156 and 158.

Selector 136 normally passes the data stream on bus 142 unaltered therethrough, as noted above. In response to an insert signal on select line 130, selector 136 blocks the passage of data from 142 and instead chooses the data from bus 154 during the channel time slot in which the channel strobe on 130 occurs. This insert data from 154 is passed to output bus 86 and transmit unit 90. The remaining two selectors 138 and 140 perform the comparable function for the other two data buses each having eight channel time slots, thus completing the three by eight matrix uniquely defining the 24 channels and enabling insertion of data into any one of the 24 channels.

Each channel unit has its own 8:1 channel strobe selector comparable to selector 120, its own user controlled channel selector comparable to channel selector 122, and its own set of 1:3 distributors comparable to insert data distributor 150 and channel strobe distributor 128. For example, the Nth channel unit 182 is provided with an 8:1 channel strobe selector 184, a user controlled channel selector 186, a 1:3 input data distributor 188 and a 1:3 channel strobe distributor 192. Insert data distributor 188 shares buses 154, 156 and 158 in common with insert data distributor 150. Channel strobe distributor 192 shares buses 130, 132 and 134 in common with channel strobe distributor 128.

In one form, four channel units are provided, and thus N equals 4. Additional capacity is provided by an auxiliary data switching unit 194 which is identical to data switching unit 84 and provides an additional four channel units. The auxiliary DSU 194 is a master or slave to the main DSU 84, as chosen by a user controlled master/slave selector 340, to be more fully described hereinafter. The slave is active only when it has data to insert. The master handles through-traffic and the insert data from its own set of channel units. The master's output to transmit unit 90 is blocked by inhibit gates 328, 330 and 332 when the slave has data to insert.

Figure 13A:
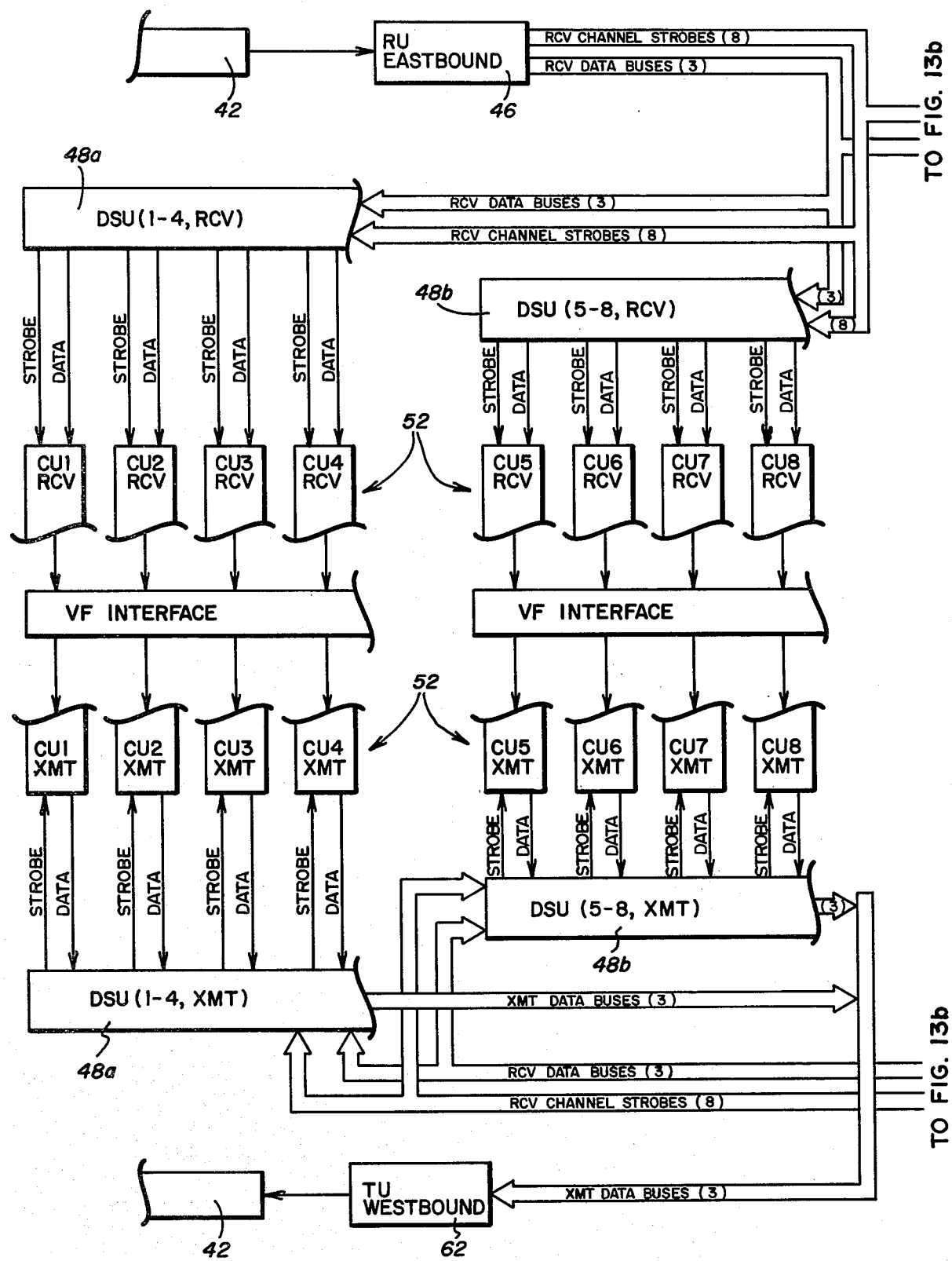
FIGS. 13a and 13b are detailed signal distribution diagrams showing the circuit connections implementing the system of FIG. 8.
Figure 13B:
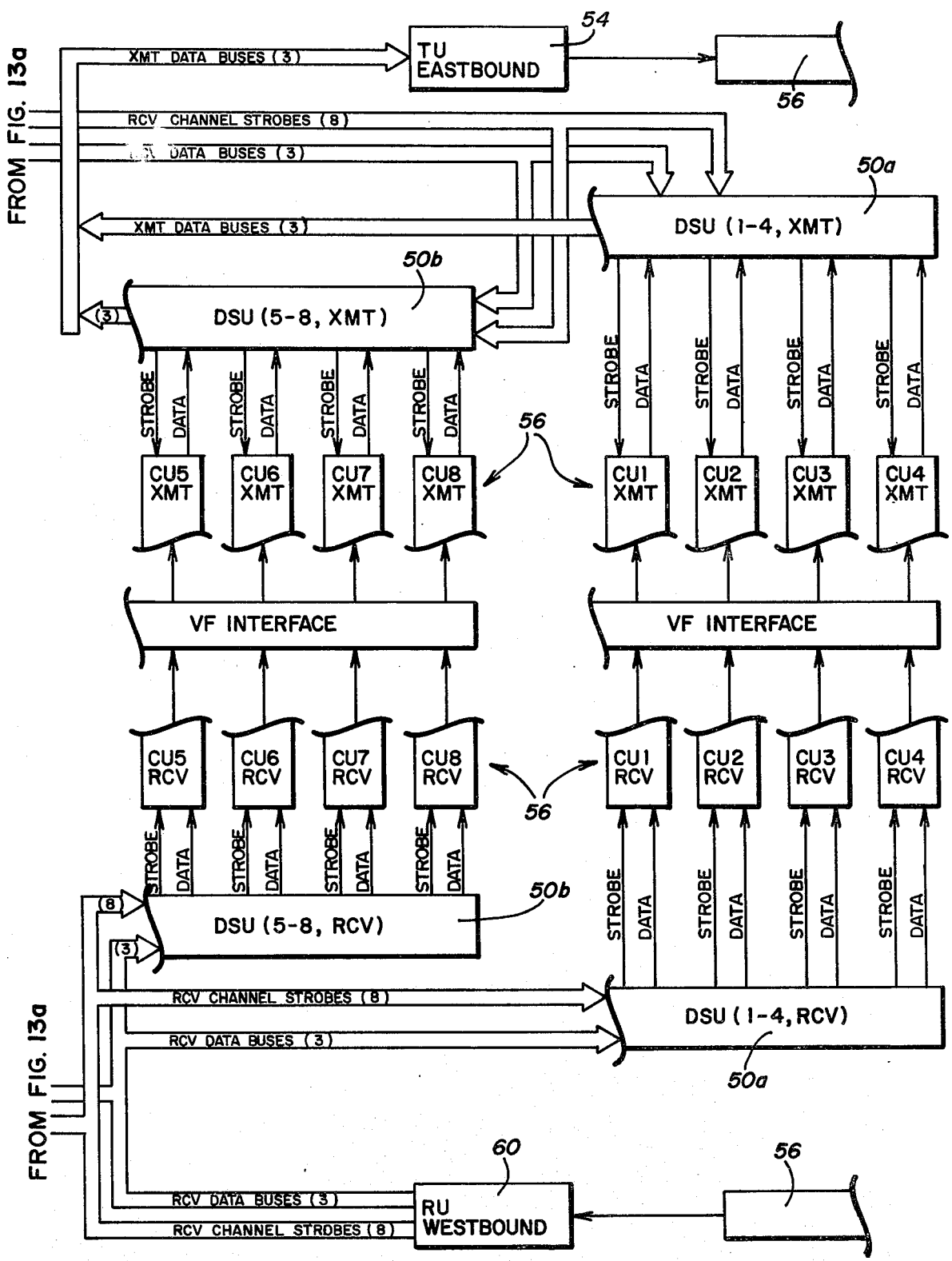

FIG. 13 is a detailed signal distribution diagram showing the circuit connections implementing the system of FIG. 8 and enabling the drop and insert operations described above. Eastbound receive unit 46 demultiplexes the data from west terminal 42 into three data buses of eight channels each and outputs the three buses and eight channel strobes to main data switching unit 48a servicing channel units 1–4 and to auxiliary data switching unit 48b servicing channel units 5–8. These data switching units send the selected channel strobe and data bus to respective west channel units 1–8 (collectively 52 in FIG. 8) for listening at the voice frequency interface. The west channel units 52 have transmit sections sending data from the voice frequency interface to the transmit sections of data switching units 48a and 48b which deliver the data to westbound transmit unit 62 for delivery to west terminal 42. The transmit sections of west data switching units 48a and 48b also receive data and channel strobes from westbound receive unit 60 receiving westbound traffic from east terminal 56. The transmit sections of west data switching units 48a and 48b either pass the digital data from westbound receive unit 60 unaltered or substitute insert channel data from one or more west channel units 52 as chosen by the user.

The data and channel strobes from eastbound receive unit 46 are also delivered to the transmit sections of east main data switching units 50a and auxiliary data switching unit 50b servicing east channel units 1–4 and 5–8, respectively (collectively 56 in FIG. 8). The transmit sections of the east channel unit 56 send data from the voice frequency interface to transmit sections of data switching units 50a and 50b for substitutional insertion in the data passing therethrough from eastbound receive unit 46 in the chosen channel or channels. The remaining channels are passed unaltered through data switching units 50a and 50b to eastbound transmit unit 54 and east terminal 56. The receive sections of east data switching units 50a and 50b receive the channel strobes and data from westbound receive unit 60 and the selected channel or channels are dropped therefrom (i.e. listened to) through the receive sections of east channel units 56 at the voice frequency interface.

Figure 14A:
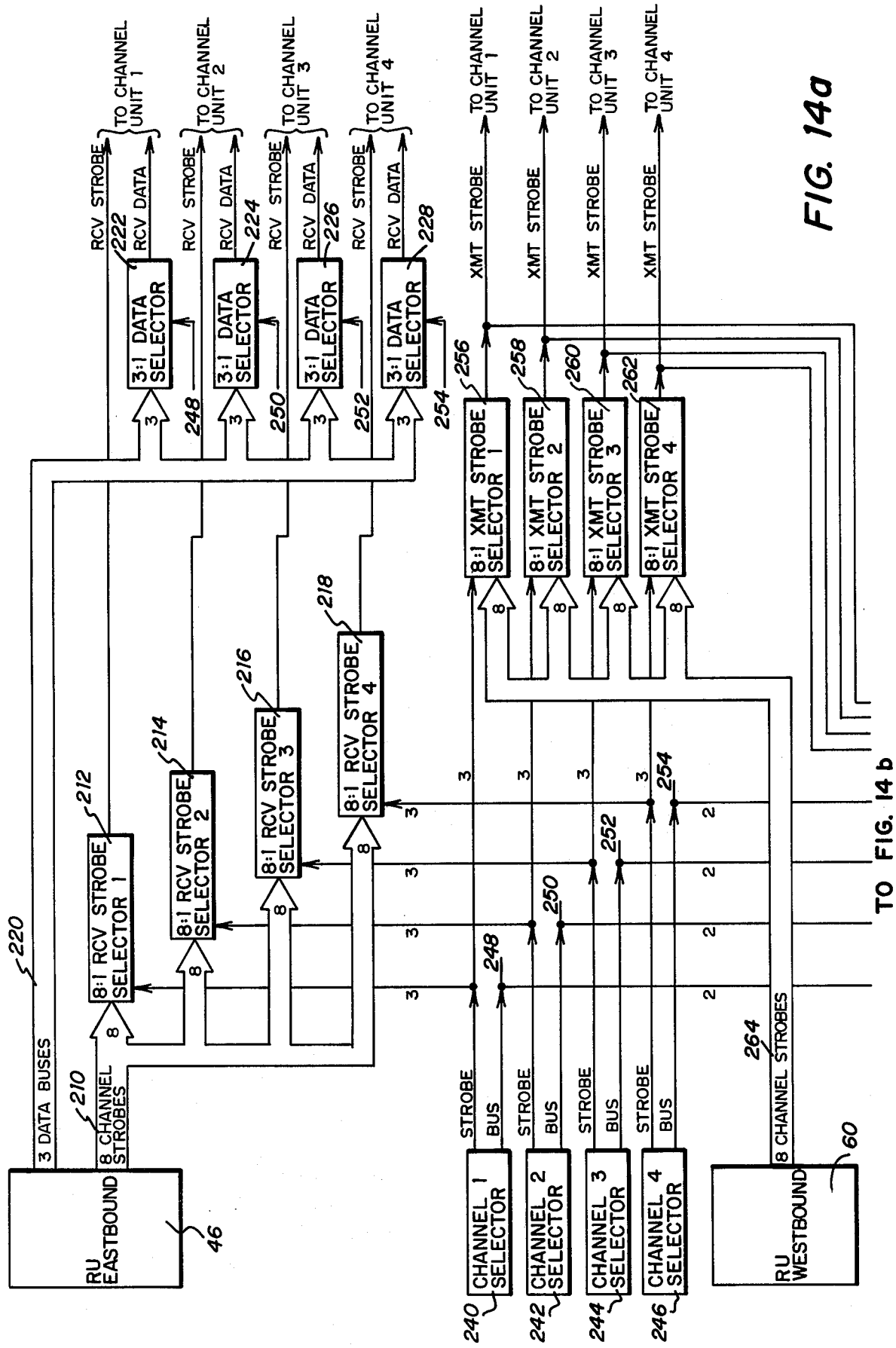
FIGS. 14a and 14b are a composite detailed circuit diagram of the west data switching unit (DSU) 48 of FIGS. 8 and 13.
Figure 14B:
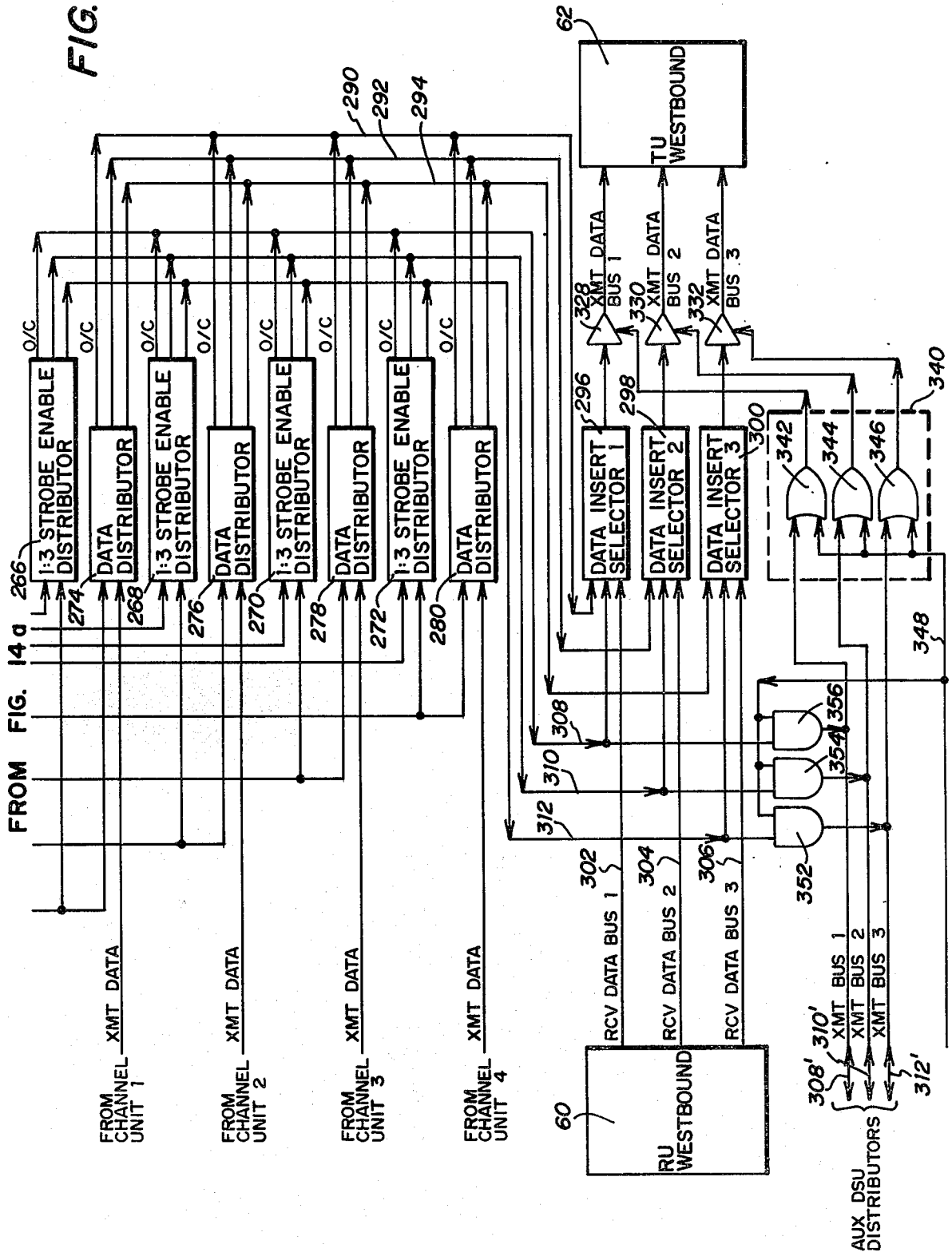

FIGS. 14a and 14b are a composite detailed circuit diagram of the west data switching unit 48 of FIGS. 8 and 13. The east data switching unit 50 is identical.

Referring to FIG. 14a, the eight receive channel strobes from eastbound receive unit 46 are delivered on a bus 210 to receive channel strobe selectors 212, 214, 216 and 228, one for each of four channel units. These selectors are comparable to selector 94 of FIG. 11 and perform a one of eight selection. The chosen channel strobe is sent to the respctive channel unit. The three demultiplexed 512 kilobit per second data streams from eastbound receive unit 46 are delivered on a bus 220 to receive data selectors 222, 224, 226 and 228, one for each of four channel units. These selectors are comparable to selector 104 of FIG. 11 and perform a one of three selection. The selected data bus is output to the respective channel unit to uniquely define, in combination with the channel strobe, one of the 24 channels.

User controlled channel selectors 240, 242, 244 and 246 each provide a three bit control code to a respective channel strobe selector 212, 214, 216 and 218, for selecting the channel strobe to be output by each. Channel selectors 240, 242, 244 and 246 also have a data bus selection control code output line 248, 250, 252 and 254, respectively, connected to selectors 222, 224, 226 and 228, respectively. These data bus selection control lines 248, 250, 252 and 254 each carry a two bit control code for designating the one of three selection to be performed by the data selectors.

The three bit channel strobe selection codes from channel selectors 240, 242, 244 and 246 are also delivered to transmit channel strobe selectors 256, 258, 260 and 262, respectively, which are comparable to one of eight channel strobe selector 120 of FIG. 12. The eight channel strobes from westbound receive unit 60 are delivered on bus 264 to transmit channel strobe selectors 256, 258, 260 and 262. Each of these selectors outputs the chosen channel strobe to its respective channel unit for strobing data therefrom.

The selected channel strobes from transmit channel strobe selectors 256, 258, 260 and 262 are also delivered to channel strobe enable distributors 266, 268, 270 and 272, respectively, which are comparable to 1:3 distributor 128 of FIG. 12. The data bus selection control code outputs 248, 250, 252 and 254 from user controlled channel selectors 240, 242, 244 and 246, respectively, are also delivered to channel strobe enable distributors 266, 268, 270 and 272, respectively, for selecting which of the three outputs from each is to carry the transmit channel strobe.

The data bus selection control code outputs 248, 250, 252 and 254 are further delivered to insert data bus distributors 274, 276, 278 and 280, respectively, comparable to 1:3 insert data bus distributor 150 of FIG. 12. Data distributor 274 receives insert data from the first channel unit as clocked by the transmit channel strobe from selector 256. The control code from line 248 determines which of the three output buses from distributor 274 carries the insert data. The operation of distributors 276, 278 and 280 is comparable.

The three output buses 290, 292 and 294 from each of the data distributors 274, 276, 278 and 280 are connected in common to three respective data insert selectors 296, 298 and 300, comparable to 2:1 selectors 136, 138 and 140 of FIG. 12. The three demultiplexed 512 kilobit per second data streams from westbound receive unit 60 are delivered on buses 302, 304 and 306 to insert selectors 296, 298 and 300, respectively. The selection control inputs for selectors 296, 298 and 300 are delivered on buses 308, 310 and 312, respectively, in common from the three outputs of each transmit strobe enable distributor 266, 268, 270 and 272. Insert selector 296 selects the input from either line 280 or 302 in accordance with the control code on line 308. Selector 296 normally chooses the digital data input from 302 and passes such data unaltered therethrough. When a channel strobe is present on 308, selector 296 chooses its other input 290 for passage therethrough. Selectors 298 and 300 function comparably.

The outputs from data insert selectors 296, 298 and 300 are delivered through respective inhibit gates 328, 330 and 332 to westbound transmit unit 62. These gates may block the passage of the outputs from their respective insert selectors in accordance with an inhibit signal from output inhibit controller 340 which is a user controller master/slave selector having a control line 348 identifying an identical auxiliary DSU as the master or the slave.

An auxiliary data switching unit may be provided which is identical to that shown in FIGS. 14a and b. The auxiliary channel strobe enable distributors (identical to distributors 266, 268, 270 and 272) have three output buses 380', 310' and 312', which are the counterpart of output buses 308, 310 and 312. Inhibit controller 340 comprises three exclusive OR gates 342, 344 and 346, each having one input from buses 308', 310' and 312', respectively, and the other input from an identity bit line 348. With line 348 grounded low, the main data switching unit of FIGS. 14a and 14b is the master. The auxiliary DSU is the slave and its counterpart twin of line 348 is tied high. When the slave has nothing to insert, then its buses 308', 310' and 312' are each low, and the output of each XOR gate 342, 344 and 346 of the master is low, whereby none of the master's inhibit gates 328, 330 and 332 is activated to a blocking state and hence data from 2:1 selectors 296, 298 and 300 of the master passes through gates 328, 330 and 332 to transmit unit 62.

If the slave has something to insert, then one or more of its buses 308', 310' and 312' goes high. For example, bus 308' goes high during a certain channel time slot, which in turn yields a high output from the master's XOR gate 342, which in turn triggers gate 328 to block data from 2:1 selector 296. The only data presented during that channel time slot on the first data bus to transmit unit 62 is from the slave.

Buses 308, 310 and 312 of the main switching unit in FIGS. 14a and 14b are connected through three AND gates 352, 354 and 356 to buses 308', 310' and 312' of the auxiliary DSU. These AND gates have their other input connected to the identity bit line 348. With line 348 low, the main DSU of FIGS. 14a and 14b is the master, as aforenoted, and the master's signals on buses 308, 310 and 312 do not pass through gates 352, 354 and 356.

In the slave, however, the twin of line 348 is high. If the slave has nothing to insert, then it buses 308', 310' and 312' are low and the outputs of the twins of gates 352, 354 and 356 are low in the slave. These low outputs together with the high state of the twin of line 348 cause a high output from the twins of gates 342, 344 and 346 which in turn cause the twins of inhibit gates 328, 330 and 332 to be in a blocking mode in the slave. Thus when the slave has nothing to insert, the only signals on the data buses to transmit unit 62 are from the master.

If the slave has something to insert, one or more of its buses 308', 310' and 312' goes high and is passed through the respective twins of gates 352, 354 and 356 to the master unit, as aforenoted, and to the slave's twin of XOR gates 342, 344 and 346. One or more of the outputs from these XOR gates in the slave goes low because of the high state of the twin of line 348 in the slave. These one or more low outputs cause the twins of inhibit gates 328, 330 and 332 to go to a nonblocking state and hence enable the slave output to pass to transmit unit 62.

The additional channel unit capacity enabled by the identical auxiliary data switching unit is a significant aspect of the preferred embodiment. With this modular building block type structure, the cost of two 4-channel data switching units is less than the cost of a single 8-channel data switching unit. The 4-channel DSU is easier to manufacture on a standard printed circuit board. Furthermore, the user need only buy what he needs, and can add more capacity later.

In the preferred form of the invention, signaling information (for a European format) and signaling coordination (for a North American format) are provided by a separate bus as a counterpart to the data bus. In a European format, one or more channels are dedicated for carrying signals for indicating off-hook, busy, etc. conditions. This dedicated-channel type signaling is also used in a CCIS system (common channel interoffice signaling), to which the invention is of course applicable. It is preferred that a separate set of buses be used for this signaling, which buses duplicate the data buses and components therefor, such as duplicate selectors, distributors, etc. This duplicate bus and component structure is not illustrated for the sake of clarity and undue prolixity, and to facilitate ease of understanding. The duplicate data and signal bus structure is also preferred for the North American format for carrying coordination information in the opposite direction of the data. In the North American format, FIGS. 3–5, signaling information is interleaved with the data and carried on the data buses. The duplicate counterpart bus and component structure is for return and feedback coordination.

Figure 15:
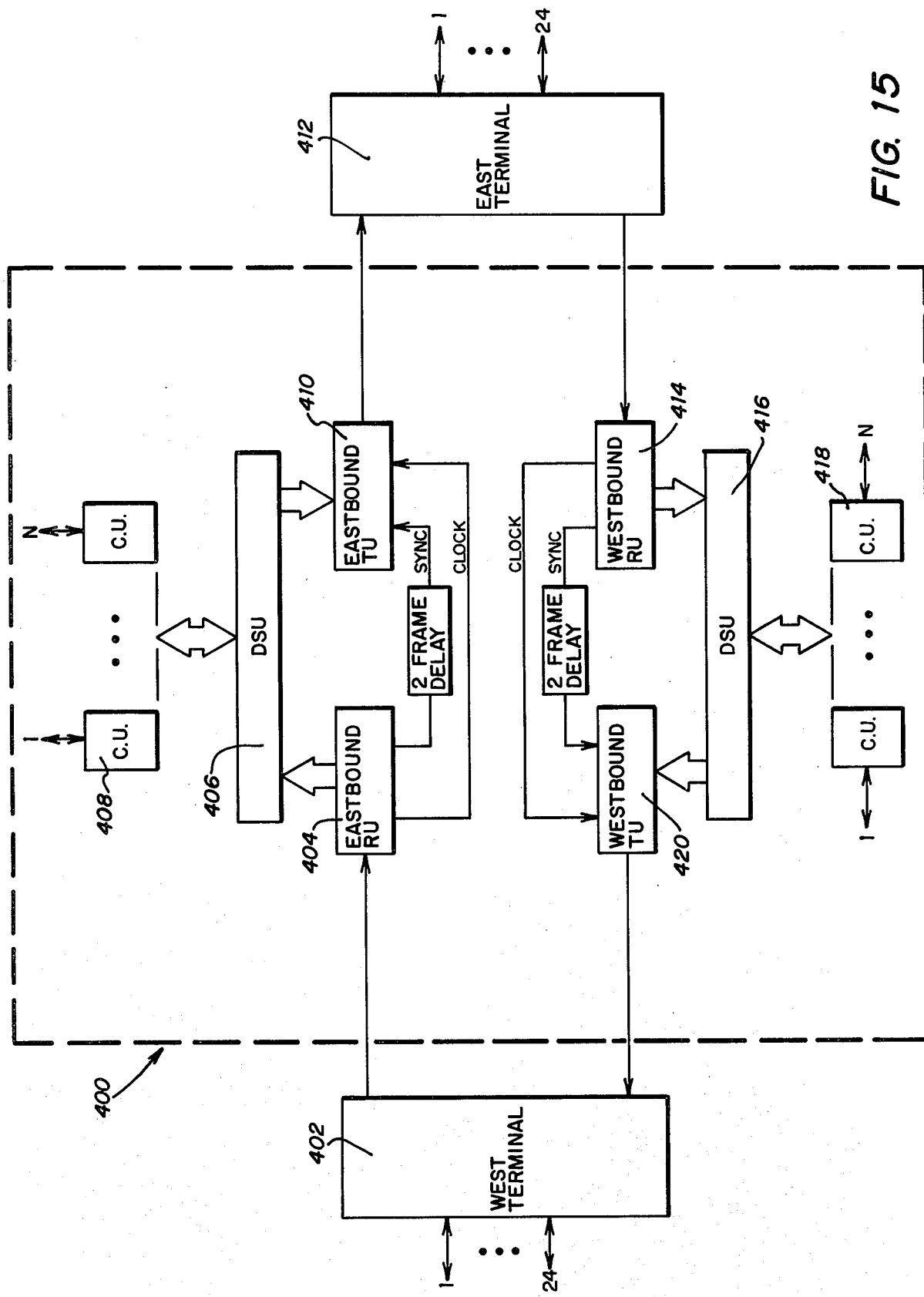
FIG. 15 shows an alternate form of the bidirectional drop and insert channel bank of FIG. 8.

FIG. 15 shows an alternate form of the bidirectional drop and insert channel bank 40 of FIG. 8. In FIG. 8, the user talks and listens to the same end terminal, i.e. channel units 52 drops channels from west terminal 42 and insert channels to west terminal 42, and channel units 56 drop channels from east terminal 57 and insert channels to east terminal 57. In FIG. 15, a channel bank 400 is provided which enables one set of channel units to listen to one end terminal and talk to the other end terminal.

In FIG. 15, west terminal 402 sends the 1.544 megabit per second data stream to eastbound receive unit (RU) 404, which is comparable to eastbound receive unit 46 of FIG. 8. These demultiplexed 512 kilobit per second data streams and eight channel strobes are set from eastbound receive unit 404 to a data switching unit (DSU) 406 which is comparable to either of the data switching units 48 or 50 in FIG. 8. Channels are dropped from switching unit 406 to channel units (CU) 408, which are comparable to channel units 52 or 56 of FIG. 8. Data is inserted from channel units 408 to switching unit 406 for substitution in the selected time slot of the data passing through switching unit 406. The unaltered data from eastbound receive unit 404 and the substituted inserted data, if any, from channel units 408 is delivered from switching unit 406 to eastbound transmit unit (TU) 410, which is comparable to eastbound transmit unit 54 of FIG. 8. Eastbound transmit unit 410 sends a multiplexed 1.544 megabit per second data stream to east terminal 412. Eastbound transmit unit 410 and eastbound receive unit 404 are synced and clocked as above. Westbound traffic is comparably handled by westbound receive unit (RU) 414, data switching unit (DSU) 416, channel units (CU) 418, and westbound transmit unit (TU) 420. The first set of channel units 408 listen to west terminal 402 and talk to east terminal 412. The second set of channel units 418 listen to east terminal 412 and talk to west terminal 402.

Figure 16:
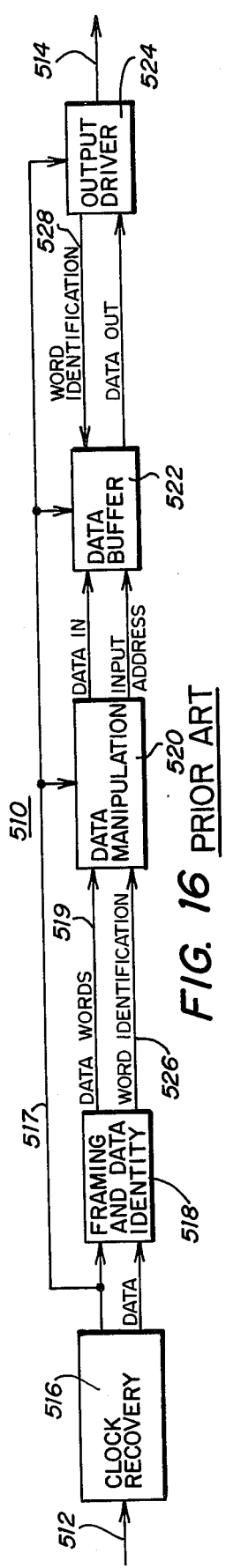
FIG. 16 is a schematic circuit diagram of prior art data coupling apparatus to facilitate understanding of the synchronization illustrated in FIGS. 17 and 18.

The above noted synchronization will now be described in greater detail in conjunction with FIGS. 16–18. FIG. 16 shows data coupling apparatus 510 which is known in the art. This coupling apparatus is interposed serially in a transmission medium such that data on input transmission line 512 must pass through the coupling apparatus 510 to reach output transmission line 514. Input transmission line 512 carries digital data in a given framing format, such as that described in conjunction with FIGS. 3–5.

Coupling apparatus 510 includes at its input a clock recovery circuit 516 which extracts clock signals from the input data by any of a number of well-known techniques, such as by a phase locked loop. Clock recovery circuit 516 outputs data and clock signals to a framing and data identity circuit 518. This circuit looks for the above noted framing bit code of the $F_i$ bits, and once recognized, assigns word or channel identification bit locations for delimiting data words, or channels.

Circuit 518 outputs data words 519 and word identification signals 526 to data manipulation means 520. This data manipulation circuit enables desired functions to be performed on the data, or performs desired functions on ancillary devices in accordance with the content of the data, or affords a given interaction with an interface device, etc. The data experiences a certain amount of inherent delay in passing through data manipulation circuit 520. Circuit 520 is clocked by the extracted clock signal 517 from recovery circuit 516.

The manipulated data output from circuit 520 is input to data buffer 522 providing a delay period. This circuit is clocked by the extracted clock signal 517 from recovery circuit 516. An output driver circuit 524 arbitrarily assigns the initial word identification bit location in the data stream output therefrom on line 514. Output alignment word identification signals 528 are sent to data buffer 522 which then outputs the data to driver circuit 524 in accordance with the channel or word delimitation assigned by circuit 524.

Buffer 522 stores the data input thereto from circuit 520 until it falls into alignment with the word identification locations assigned by driver circuit 524, i.e. buffer 522 delays the data until driver circuit 524 indicates it is ready and has chosen its word alignment location. Circuit 520 typically sends input address information to buffer 522 to indicate where the data is to be stored, and word identification signals 528 typically include output address information for retrieval. Output driver circuit 524 is clocked by the extracted clock signal 517 from recovery circuit 516. This same operation can be accomplished by an elastic buffer with its own oscillator running at a given frequency.

In coupler apparatus 510, there are two different word identification alignment locations, one from the input and the other from the output. Data buffer 522 accommodates the difference between these two word identification alignment locations. The two different sets of word identification signals are designated input word identification signals 526 and output word identification signals 528.

Figure 17:
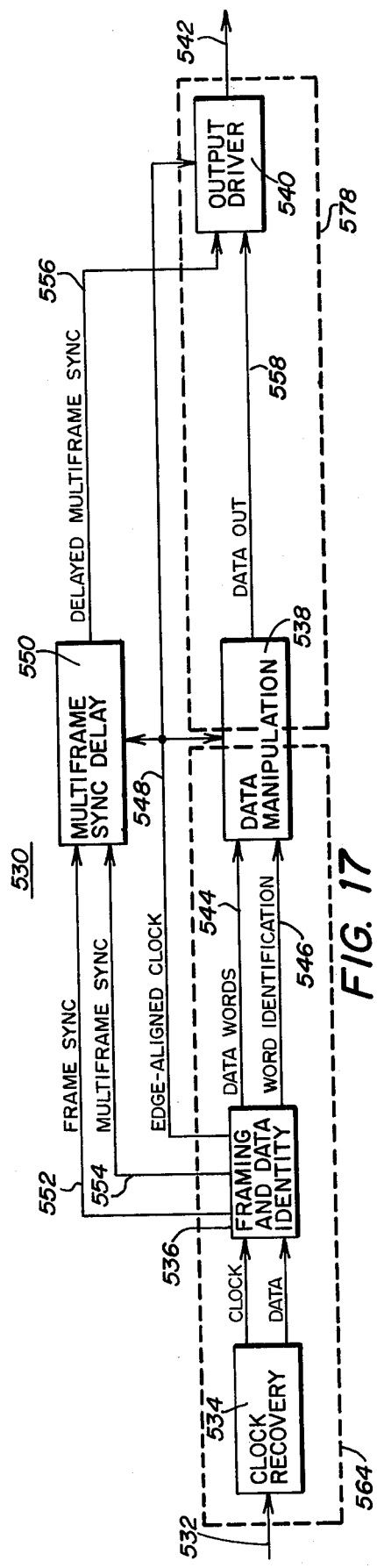
FIG. 17 is a schematic circuit diagram of a synchronization system.

FIG. 17 shows a synchronization system 530 for use in a channel bank constructed in accordance with the invention. Data from transmission medium 532 is received at input means including a clock recovery circuit 534 and a framing and data identity circuit 536. The latter circuit delivers data words 544 and word identification signals 546 to a data manipulation circuit 538 which outputs the manipulated data 558 to output driver circuit 540 which in turn delivers the data to a transmission medium 542.

Framing and data word identity circuit 536 functions similarly to circuit 518 of FIG. 16 by receiving data and extracted clock signals from clock recovery circuit 534 and delivering data words 544 and word indentification signals 546 delimiting data words 544. Circuit 536 also delivers clock signals 548 which are edge-aligned with data words 544. The edge-aligned clock may be provided, for example, by a type D flip-flop receiving the data from circuit 534 at its D input and receiving the extracted clock signals from circuit 534 at its clock input, and delivering data words 544 from its Q output. The data is thus retimed or shifted into edge alignment with the clock from circuit 534 which is output on 548.

Framing and data identity circuit 536 also delivers framing identification signals to synchronization delay means 550. For the above described format, a frame sync signal 552 is delivered for each framing bit $F_i$, and a multiframe sync signal 544 is delivered in response to the above noted framing bit code sequence for initiating a cycle. Delay means 550 delays the framing identification signals by a predetermined increment such that a framing identification signal on output 556 arrives at output driver 540 at the same time as data 558 from manipulation circuit 538. In this manner, the framing identification signal 556 synchronously aligns with its appropriate data 558 in output driver 540. For the above format, delay means 550 is a multiframe sync delay which delays the multiframe sync signal by an increment equal to the inherent delay of data transmission through data manipulation circuit 538.

Data from manipulation circuit 538 is delivered directly to output driver 540. The data is not delivered through a data buffer, but rather passes through the system in real time with only inherent delays attendant thereto. Furthermore, the data is delivered to output driver 540 without return alignment output identification signals such as 528 in FIG. 4. The data passes through output driver 540 independently of output alignment identification and data buffering.

As the data travels through output driver 540, the framing identification signal on line 556 tells the output driver 540 where it is in the bit stream, i.e., the signal on line 556 identifies which frame is currently passing through output driver 540. This identification or sync signal on line 556 does not interfere with the data passing through driver 540. The data passes through driver 540 independently of the sync signal on line 556. The data and the sync signals on 558 and 556 are coordinated by their synchronously aligned arrival time at output driver 540.

Edge-aligned clock signals 548 drive data manipulation circuit 538, multiframe sync delay 550 and output driver 540. Since clock signal 548 is edge-aligned with data words 544, these signals stay in synchronism through data manipulation circuit 538.

Figure 18:
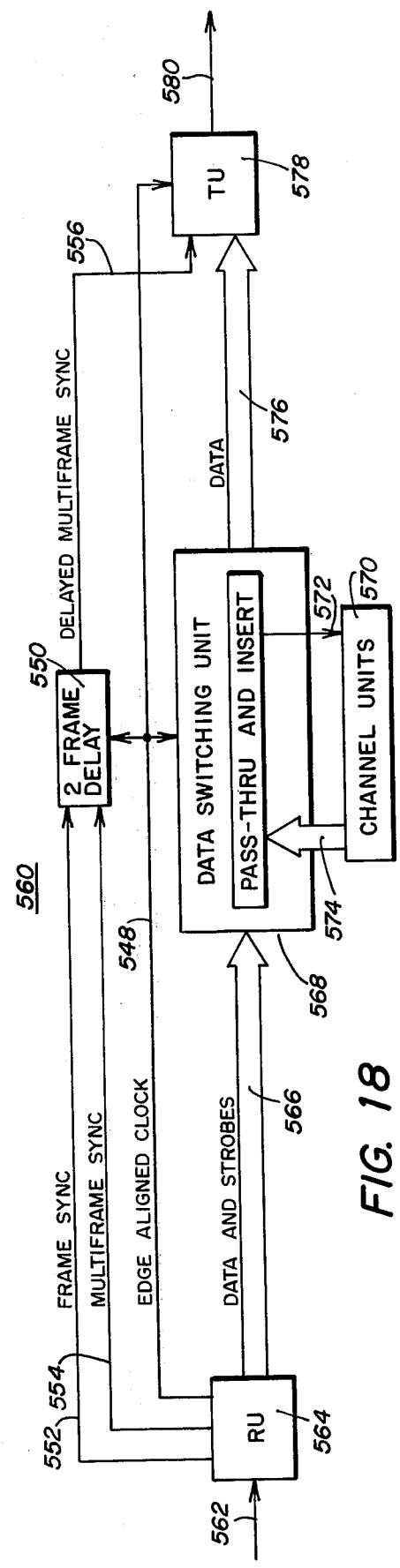
FIG. 18 is a schematic circuit diagram illustrating synchronization of a receive unit (RU) and a transmit unit (TU).

FIG. 18 shows the circuit of FIG. 17 as used in a drop and insert channel bank 560 constructed in accordance with the invention. Data on transmission medium 562 is input to a receive unit (RU) 564 which includes clock recovery circuit 534, framing and data word identity circuit 536 and a portion of data manipulation circuit 538, as shown in dashed line in FIG. 17. The data manipulation portion of receive unit 564 demultiplexes the input data to a lower rate and outputs a plurality of data buses and channel strobes 566, for example, three data buses and eight channel strobes defining each of the twenty-four channels. This manipulation of data requires a one frame delay, such that as receive unit 564 is receiving frame 5 from transmission medium 562, it is outputting frame 4.

Bus matrix 566 is connected to a data switching unit (DSU) 568 which includes selective gating circuitry as above described for either passing the data therethrough or substitutionally inserting data from any of a number of channel units 570 into the bit stream. In a selectively chosen insert mode, the strobes are output on line 572 to clock data from the channel units into the data switching unit 568 via bus 574 at the appropriate time slot. Data is inserted in bank 568 in real time without data storage buffering. Both pass-through and insert modes are digital. There is substantially no delay between data entering on buses 566 and data output on buses 576.

The data output on buses 576 is delivered to a transmit unit (TU) 578 which includes the remaining portion of data manipulation circuit 538, and output driver 540, as shown in dashed line in FIG. 17. The manipulation portion of transmit unit 578 multiplexes the data on buses 576 back up to the higher speed and delivers the serial multiplexed data to transmission medium 580. This manipulation of data requires a one frame delay, and hence while transmit unit 78 is receiving frame 4 from buses 576, it is outputting frame 3.

Synchronization delay means 550 provides a two frame delay of the multiframe sync signal. This is the inherent delay which the data experiences in passing through the manipulation circuitry of receive unit 564 and transmit unit 578. The data experiences a one frame delay in passing through receive unit 564, and experiences a one frame delay in passing through transmit unit 578, such that as receive unit 564 is receiving frame 5, transmit unit 578 is outputting frame 3. Delay means 550 delays the sync or framing identification signal by two frames such that this signal waits for the data to arrive at the output driver section in transmit unit 578 such that the sync signal for frame 5 and the data for frame 5 arrive at output driver 540 at the same time in synchronous alignment. Since the clock signals 548 are edge-aligned with the data, data switching unit 568 knows where it is in the bit stream, i.e. which frame and channel is currently passing therethrough, and hence data may be inserted into the appropriate channel.

It is recognized that various modifications are possible within the scope of the appended claims.

We claim:

1. A drop and insert channel bank for a digital transmission system carrying a plurality of multiplexed channels on a transmission medium between a pair of terminals, comprising:
    a receive unit connected to said transmission medium for receiving said channels;
    a transmit unit connected to said transmission medium for transmitting said channels;
    a data switching unit connected between said receive unit and said transmit unit for selectively dropping any one or more channels through said receive unit and inserting any one or more channels through said transmit unit, including means for passing non-inserted channels through said data switching unit solely in digital form, without conversion to and from analog form;
    a plurality of channel units each corresponding to an individual channel, connected to and sharing in common, said data switching unit;
    said receive unit comprising means demultiplexing data from said transmission medium into a matrix of X channel strobes by Y data buses;
    said data switching unit including a receive portion having a channel strobe and data bus selector pair for each of said channel units, said pair delivering a single channel strobe and single data bus to its respective channel unit to uniquely define one of said channels;
    said transmit unit comprising means multiplexing Y data buses from said data switching unit for serial transmission over said transmission medium; and
    said data switching unit further including a transmit portion having a channel strobe and data bus distributor pair for each of said channel units, said pair selectively distributing data from its respective channel unit into one channel time slot on one of Y data buses to said transmit unit to uniquely define one of said channels into which said last mentioned data is inserted, each channel thereby being selectable to carry data from or to any said channels in said transmission medium through said commonly shared data switching unit, whereby to enable any of said channels on said transmission medium to be dropped or inserted without fully equipping said channel bank with dedicated equipment for every said channel.

2. The invention according to claim 1 wherein said transmit portion of said data switching unit further includes:
    an insert selector for each of the Y data buses to said transmit unit, each insert selector having a control input from said channel strobe distributors, a first data input from data bus distributors, and a second data input for through-traffic, said insert selector normally choosing said second data input and delivering through-traffic to its respective data bus to said transmit unit, said insert selector choosing said first data input in response to a channel strobe enable signal at said control input for delivering insert data during the strobed channel time slot from said data bus distributors.

3. The invention according to claim 2 wherein said transmit portion of said data switching unit further includes inhibit gates between said insert selectors and transmit unit, and an inhibit controller for controlling said inhibit gates such that a pair of identical said data switching units may be connected in master slave relation to increase the channel unit capacity of said bank.

4. The invention according to claim 2 wherein:
said receive unit and said transmit unit are connected to oppositely directed eastbound and westbound portions of said transmission medium, respectively;
said channel bank further includes a westbound receive unit connected between said westbound portion of said transmission medium and said data switching unit such that westbound through-traffic travels through said westbound receive unit then through said data switching unit then through said westbound transmit unit;
said westbound receive unit comprises means demultiplexing data from said transmission medium into a matrix of X channel strobes by Y data buses;
said transmit portion of said data switching unit further includes a set of channel strobe selectors, one for each said channel unit, each selector receiving X channel strobes from said westbound receive unit and selectively delivering a single channel strobe to the respective said channel unit for that selector for strobing data from that channel unit to its respective said data bus distributor, the outputs of said last mentioned channel strobe selectors also being delivered to respective said channel strobe distributors; and
each said insert selector receives a respective one of said last mentioned Y data buses at said second data input.

5. The invention according to claim 2 wherein:
said receive unit and said transmit unit are connected to a commonly directed portion of said transmission medium;
through-traffic on said commonly directed portion travels through said receive unit then through said data switching unit then through said transmit unit;
said single channel strobes from said channel strobe selectors in said receive portion of said data switching unit to respective said channel units for dropping data thereto also strobe insert data from said channel units to respective said data bus distributors in said transmit portion of said data switching unit;
the outputs of said channel strobe selectors in said receive portion of said data switching unit are also connected to respective said channel strobe distributors in said transmit portion of said data switching unit; and
said Y data buses from said receive unit are also connected to respective said insert selectors at said second data input for passage to respective said Y data buses to said transmit unit in the absence of a channel strobe enable signal at said control input.

6. A drop and insert channel bank for a digital transmission system carrying a plurality of multiplexed channels on a transmission medium between a pair of terminals, comprising:
a receive unit connected to said transmission medium for receiving said channels;
a transmit unit connected to said transmission medium for transmitting said channels;
a data switching unit connected between said receive unit and said transmit unit for selectively dropping any one or more channels through said receive unit and inserting any one or more channels through said transmit unit; and
a plurality of channel units each corresponding to an individual channel connected to and sharing in common said data switching unit, each channel unit selectable to carry data from or to any of said channels in said transmission medium through said commonly shared data switching unit, whereby to enable any of said channels on said transmission medium to be dropped or inserted without fully equipping said channel bank with dedicated equipment for every said channel,
said data switching unit comprising means for generating an inhibit command, and selective output control means for blocking passage of channels to said transmit unit in response to an inhibit command, such that a pair of identical said data switching units may be used in master/slave relation with said inhibit command means of one data switching unit connected to said selective output control means of the other data switching unit, each said data switching unit having its own set of said channels units but sharing the same said transmit unit, whereby to double the channel unit capacity of an existing said channel bank by a simple add-on slave data switching unit without duplicating the entire channel bank.

7. A channel bank for a transmission system carrying a plurality of multiplexed digital channels on a transmission medium between a pair of terminals, comprising:
receiver means connected to said transmission medium for receiving said channels and comprising demultiplexer means demultiplexing data from said transmission medium into Y buses of X channels each and outputting Y data buses and X channel strobes;
switching means connected to said receiver means for receiving said Y data buses and said X channel strobes, comprising:
N sets of selectors, each set comprising a 1 of X selectors, a 1 of Y selector, and a user controlled channel selector for choosing the 1 of X and 1 of Y selections; and
means connecting said X channel strobes to said 1 of X selector in each of said N sets, and connecting said Y data buses to said 1 of Y selector in each of said N sets, each set outputting a single channel strobe and the data from one of said Y buses as respectively chosen by each said channel selector; and
N channel units each connected to the output of a respective one of said N selector sets.

8. A channel bank for a transmission system carrying a plurality of multiplexed digital channels on a transmission medium between a pair of terminals, comprising:
transmit means connected to said transmission medium for inserting one or more channels therein;
switching means connected to said transmit means for selecting one or more channels for insertion;
channel unit means connected to said switching means for sending the channels to be inserted;
receiver means demultiplexing data from said transmission medium into Y buses of X channels each and outputting Y data buses and X channel strobes to said switching means;
said switching means comprising N sets of selectors, each set comprising a 1 of X selector, a 1 to Y distributor, and a user controlled channel selector for choosing the 1 of X selection and the 1 to Y distribution;

said channel unit means comprising N channel units each connected to the input of a respective one of said 1 to Y distributors;

said switching means comprising means connecting said X channel strobes to said 1 of X selectors in each of said N sets, and connecting the outputs of said 1 of X selectors to respective 1 to Y distributors and to respective channel units for strobing data from a channel unit to a 1 to Y distributor, said 1 to Y distributor in each of said N sets outputting data on one of Y buses as chosen by said channel selector for that set;

said switching means comprising Y 1 of 2 selectors and means connecting Y data buses from said demultiplexer means to respective said Y 1 of 2 selectors and connecting said Y data buses and said Y channel strobe buses from each of said N 1 to Y distributors to said 1 of 2 selectors such that each said 1 of 2 selector chooses data from said demultiplexer means in the absence of a channel selection and chooses data from said 1 to Y distributor in response to a channel selection; and said transmit means comprising multiplexer means multiplexing the data outputs of said Y 1 of 2 selectors.

9. The invention according to claim 8 wherein:

said receiver means comprises demultiplexer means demultiplexing data from said transmission medium into Y buses of X channels each and outputting Y data buses and X channel strobes to said switching means;

said switching means comprises N sets of selectors, each set comprising a 1 of X selector, a 1 of Y selector, and a user controlled channel selector for choosing the 1 of X and 1 of Y selections;

said switching means comprises means connecting said X channel strobes to said 1 of X selector in each of said last mentioned N sets, and connecting said Y data buses to said 1 of Y selector in each of said last mentioned N sets, each set outputting a single channel strobe and the data from one of said Y buses as respectively chosen by each said last mentioned channel selector; and said N channel units are each connected to the output of a respective one of said last mentioned N selector sets.

10. A bidirectional drop and insert channel bank for receiving signals from either or both of a pair of end terminals by dropping one or more channels from a transmission medium therebetween, and for sending signals to either or both of said terminals by inserting one or more channels on said transmission medium, said terminals being assigned designations as a west terminal and an east terminal, and said transmission medium thereby having an eastbound portion and a westbound portion, said channel bank comprising:

a pair of receivers comprising an eastbound receiver connected to said eastbound portion of said transmission medium for receiving signals from said west terminal, and a westbound receiver connected to said westbound portion of the transmission medium for receiving signals from the east terminal;

a pair of transmitters comprising a westbound transmitter connected to the westbound portion of the transmission medium for sending signals to the west terminal, and an eastbound transmitter connected to the eastbound portion of the transmission medium for sending signals to the east terminal;

a pair of switching units comprising a west switching unit and an east switching unit;

a pair of groups of one or more channel units comprising a west group of one or more channel units connected to said west switching unit, and an east group of one or more channel units connected to said east switching unit;

means for connecting each of said switching units between one of the receivers and transmitters so that eastbound signal traffic travels through said eastbound receiver then through said east switching unit then through said eastbound transmitter, eastbound signal traffic is also delivered to said west switching unit for selective delivery of one or more channels to said west channel units, westbound signal traffic travels through said westbound receiver then through said west switching unit then through said westbound transmitter, and westbound signal traffic is also delivered to said east switching unit for selected delivery of one or more channels to said east channel units;

each of said receivers comprising means demultiplexing data from said transmission medium into a matrix of X channel strobes by Y data buses;

each of said switching units including a receive portion having a channel strobe and data bus selector pair for each of the associated channel units, said pair delivering a single channel strobe and single data bus to its respective channel unit to uniquely define one of said channels;

each of said transmitters comprising means multiplexing Y data buses from the associated switching unit for serial transmission over said transmission medium; and each of said switching units further including a transmit portion having a channel strobe and data bus distributor pair for each of the associated channel units, said pair selectively distributing data from its respective channel unit into one channel time slot on one of Y data buses to the associated transmitter to uniquely define one of said channels into which said last mentioned data is inserted;

said east switching unit including means for selectively inserting signals in any one or more channels in said eastbound traffic passing therethrough from said eastbound receiver by substituting signals from any one or more of said east channel units for any one or more of said channels in said eastbound traffic;

said west switching unit including means for selectively inserting signals in any one or more channels in said westbound traffic passing therethrough from said westbound receiver by substituting signals from any one or more of said west channel units for any one or more of said channels in said westbound traffic, whereby said west channel units receive signals from said west terminal and send signals to said west terminal, and said east channel units receive signals from said east terminal and send signals to said east terminal, said channel unit operators thus receiving and sending signals from and to the same terminal.

11. The invention according to claim 10 wherein said west switching unit comprises user controlled drop and insert channel selector means for dropping any channel in said eastbound traffic to any said west channel unit and for inserting signals from any said west channel unit into any channel in said westbound traffic, and wherein said east switching unit comprises user controlled drop and insert channel selector means for dropping any channel in said westbound traffic to any said east channel unit and for inserting signals from any said east channel unit into any channel in said eastbound traffic.

12. A bidirectional drop and insert channel bank for receiving signals from either or both of a pair of end terminals by dropping one or more channels from a transmission medium therebetween, and for sending signals to either or both of said terminals by inserting one or more channels on said transmission medium, said terminals being assignable a designation as a west terminal and an east terminal, and said transmission medium thereby having an eastbound portion and a westbound portion, comprising:

a pair of receivers comprising an eastbound receiver connected to said eastbound portion of the transmission medium for receiving signals from the west terminal, and a westbound receiver connected to the westbound portion of the transmission medium for receiving signals from the east terminal;

a pair of transmitters comprising a westbound transmitter connected to the westbound portion of the transmission medium for sending signals to the west terminal, and an eastbound transmitter connected to the eastbound portion of the transmission medium for sending signals to the east terminal;

a pair of switching units comprising an eastbound switching unit and a westbound switching unit;

a pair of groups of one or more channel units, comprising an eastbound group of one or more channel units connected to the eastbound switching unit, and a westbound group of one or more channel units connected to the westbound switching unit;

means for connecting each of the switching units between one of the receivers and transmitters so that eastbound signal traffic travels through said eastbound receiver then through said eastbound switching unit then through said eastbound transmitter, and westbound signal traffic travels through said westbound receiver then through said westbound switching unit then through said westbound transmitter;

each of said receivers comprising means demultiplexing data from said transmission medium into a matrix of X channel strobes of Y data buses;

each of said switching units including a receive portion having a channel strobe and data bus selector pair for each of the associated channel units, said pair delivering a single channel strobe and single data bus to its respective channel unit to uniquely define one of said channels;

each of said transmitters comprising means multiplexing Y data buses from the associated switching unit for serial transmission over said transmission medium; and each of said switching units further including a transmit portion having a channel strobe and data bus distributor pair for each of the associated channel units, said pair selectively distributing data from its respective channel unit into one channel time slot on one of Y data buses to the associated transmitter to uniquely define one of said channels into which said last mentioned data is inserted;

said eastbound switching unit including means for selectively dropping any one or more channels in said eastbound traffic passing therethrough from said eastbound receiver to any one or more of said eastbound channel units;

said eastbound switching unit includes means for selectively inserting signals in any one or more channels in said eastbound traffic passing therethrough from said eastbound receiver by substituting signals from any one or more of said eastbound channel units for any one or more of said channels in said eastbound traffic;

said westbound switching unit including means for selectively dropping any one or more channels in said westbound traffic passing therethrough from said westbound receiver to any one or more of said westbound channel units; and said westbound switching unit including means for selectively inserting signals in any one or more channels in said westbound traffic passing therethrough from said westbound receiver by substituting signals from any one or more of said westbound channel units for any one or more of said channels in said westbound traffic, whereby said eastbound channel units receive signals from said west terminal and send signals to said east terminal, and said eastbound channel units receive signals from said east terminal and send signals to said west terminal, channel unit operators receiving and sending signals from and to opposite terminals.

13. An inserting channel bank for a transmission system carrying a plurality of multiplexed digital channels on a transmission medium between a pair of terminals, comprising:

receiver means connected to said transmission medium for receiving said channels;

switching means connected to said receiver means for selecting one or more of said channels;

a plurality of channel units connected to said switching means;

transmit means, connected to provide data from said switching means to said transmission medium, for inserting on the latter one or more channels from selected one or more of said channel units, respectively;

means for providing from said receiver means one or more synchronization signals and a clock signal, said clock signal being provided to said switching means and to said transmit means; and delay means responsive to said one or more synchronization signals and to said clock signal for providing a delayed synchronization signal to said transmit means so that said inserting by the latter is aligned with said data from said switching means, whereby the alignment avoids a requirement of buffering said data.

14. The channel bank of claim 13, wherein said one or more synchronization signals comprise a frame sync and multiframe sync, wherein said clock is an edge aligned clock and said delayed synchronization signal is a delayed multiframe sync.

15. A drop and insert channel bank for a digital transmission system carrying a plurality of multiplexed channels on a transmission medium between a pair of terminals, comprising:

a receive unit connected to said transmission medium for receiving said channels;

a transmit unit connected to said transmission medium for transmitting said channels;

a data switching unit connected between said receive unit and said transmit unit for selectively dropping any one or more channels through said receive unit and inserting any one or more channels through said transmit unit; and a plurality of channel units each corresponding to an individual channel connected to and sharing in common said data switching unit, each channel unit selectable to carry data from or to any of said channels in said transmission medium through said commonly shared data switching unit, whereby to enable any of said channels on said transmission medium to be dropped or inserted without fully equipping said channel bank with dedicated equipment for every said channel;

means for providing from said receive unit one or more synchronization signals and a clock signal, said clock signal being provided to said data switching unit and to said transmit unit; and delay means responsive to said one or more synchronization signals and to said clock signal for providing a delayed synchronization signal to said transmit unit so that said inserting through said transmit unit is aligned with data received at the transmit unit from the data switching unit, whereby the alignment avoids a requirement of buffering said data.

16. The invention according to claim 3, wherein the output of said channel strobe distributors of the slave data switching unit is connected to said inhibit controller of the master data switching unit to provide an inhibit command thereto such that the correspondent output through-traffic channel from said insert selector of the master data switching unit is blocked by its said inhibit gate and the insert channel from said insert selector of the slave data switching unit is passed through its said inhibit gate to said transmit unit.

* * * * *